(12) United States Patent
Miyashita et al.

(10) Patent No.: US 8,412,280 B2
(45) Date of Patent: Apr. 2, 2013

(54) ELECTRONIC APPARATUS

(75) Inventors: Yosuke Miyashita, Chiba (JP); Wataru Saito, Kanagawa (JP); Hironari Hoshino, Tokyo (JP); Soichi Tanaka, Kanagawa (JP); Takeshi Goto, Saitama (JP)

(73) Assignee: Sony Corporation (JP)

( * ) Notice: Subject to any disclaimer, the term of this patent is extended or adjusted under 35 U.S.C. 154(b) by 239 days.

(21) Appl. No.: 12/806,540

(22) Filed: Aug. 16, 2010

(65) Prior Publication Data

US 2011/0053651 A1 Mar. 3, 2011

(30) Foreign Application Priority Data

Aug. 26, 2009 (JP) ................. P2009-195277

(51) Int. Cl.
*H04M 1/02* (2006.01)
(52) U.S. Cl. ............. 455/566; 361/679.01; 455/550.1
(58) Field of Classification Search .............. 455/566, 455/550.1; 180/227; 264/40.7; 43/131; 425/130, 145, 224; 361/679.01, 679.2, 679.27; 345/156, 173
See application file for complete search history.

(56) References Cited

U.S. PATENT DOCUMENTS

| | | | | |
|---|---|---|---|---|
| 5,198,966 A | * | 3/1993 | Kobayashi et al. | 361/679.09 |
| 6,219,681 B1 | * | 4/2001 | Hawkins et al. | 708/100 |
| 6,549,789 B1 | * | 4/2003 | Kfoury | 455/550.1 |
| 6,883,206 B2 | * | 4/2005 | Yang et al. | 16/337 |
| 7,345,871 B2 | * | 3/2008 | Lev et al. | 361/679.27 |
| 2002/0097217 A1 | | 7/2002 | Ho | |
| 2004/0141284 A1 | * | 7/2004 | Chen et al. | 361/681 |
| 2005/0207104 A1 | * | 9/2005 | Love | 361/683 |
| 2006/0044743 A1 | * | 3/2006 | Ito et al. | 361/681 |
| 2009/0009950 A1 | * | 1/2009 | Hattori et al. | 361/681 |
| 2010/0194692 A1 | * | 8/2010 | Orr et al. | 345/173 |

FOREIGN PATENT DOCUMENTS

| | | |
|---|---|---|
| CN | 101277321 A | 10/2008 |
| JP | 07-084677 A | 3/1995 |
| JP | 2004-185164 A | 7/2004 |
| JP | 2006-166293 A | 6/2006 |

OTHER PUBLICATIONS

Office Action from Chinese Application No. 201010260589.0, dated Apr. 28, 2012.

* cited by examiner

*Primary Examiner* — Mahendra Patel
(74) *Attorney, Agent, or Firm* — Lerner, David, Littenberg, Krumholz & Mentlik, LLP

(57) ABSTRACT

Electronic apparatus which may include a main body portion having a back surface and a keyboard located at a part of the main body portion other than the main body portion back surface, a display portion having a back surface and a display screen on a display surface opposite the display portion back surface, and a coupling portion that rotatably couples the main body portion and the display portion. In a closed state, the main body portion back surface and the display portion back surface may face each other and the electronic apparatus may be operable as a portable apparatus in which all of the display surface having the display screen except for a relatively small perimeter portion thereof may be usable as a display in at least a direction corresponding to the width thereof. In an open state, the electronic apparatus may be operable as a personal computer.

15 Claims, 23 Drawing Sheets

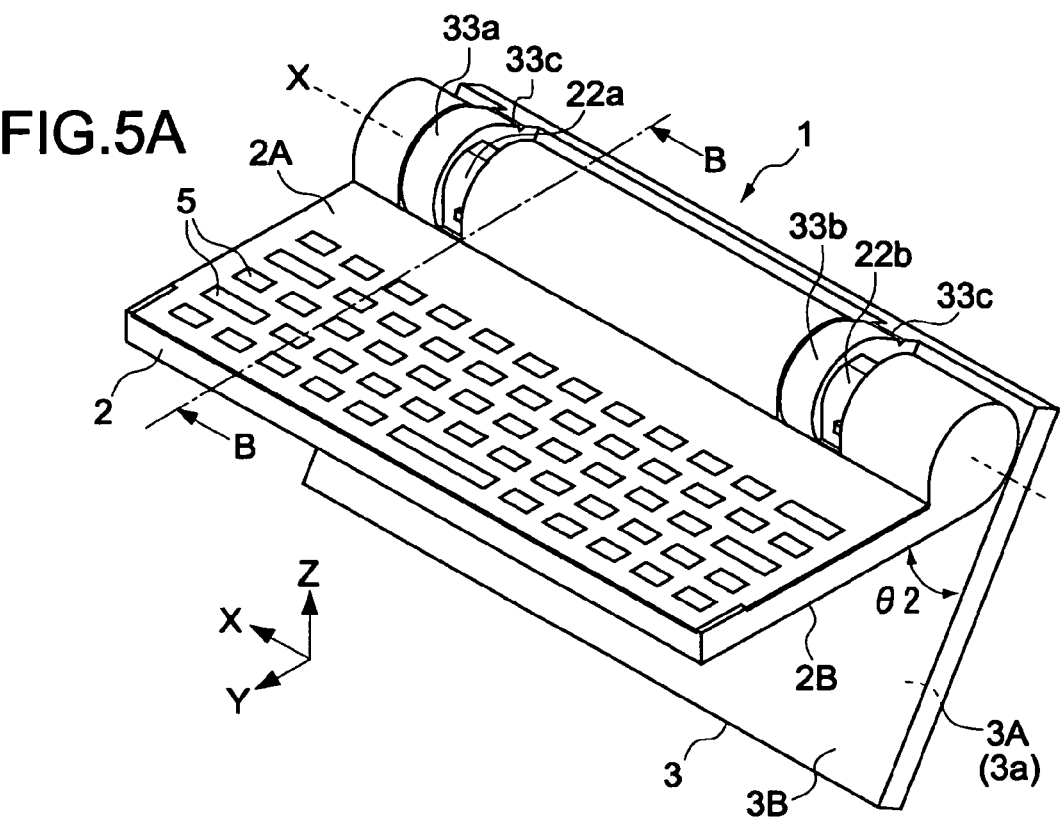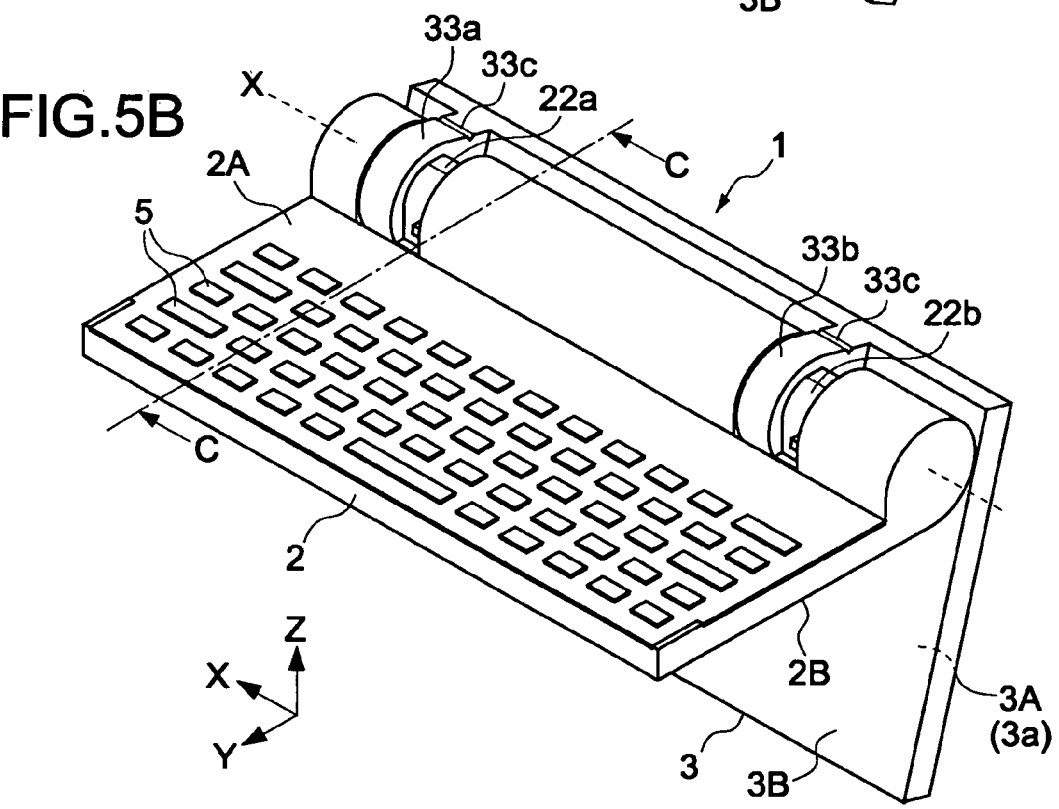

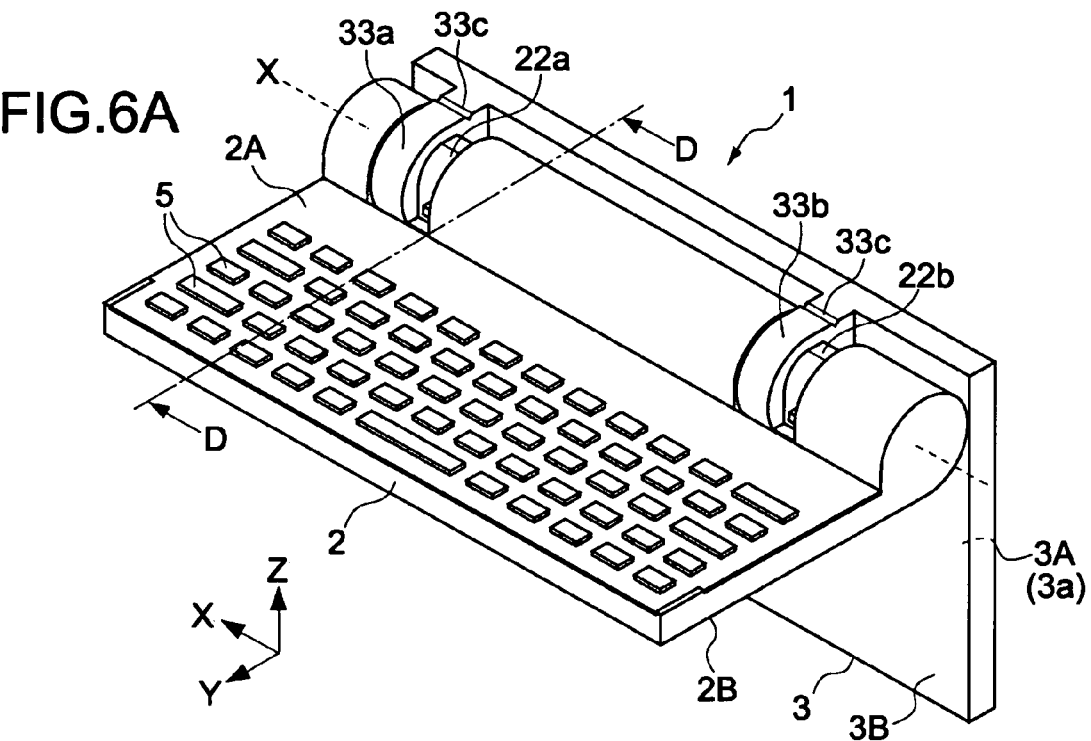
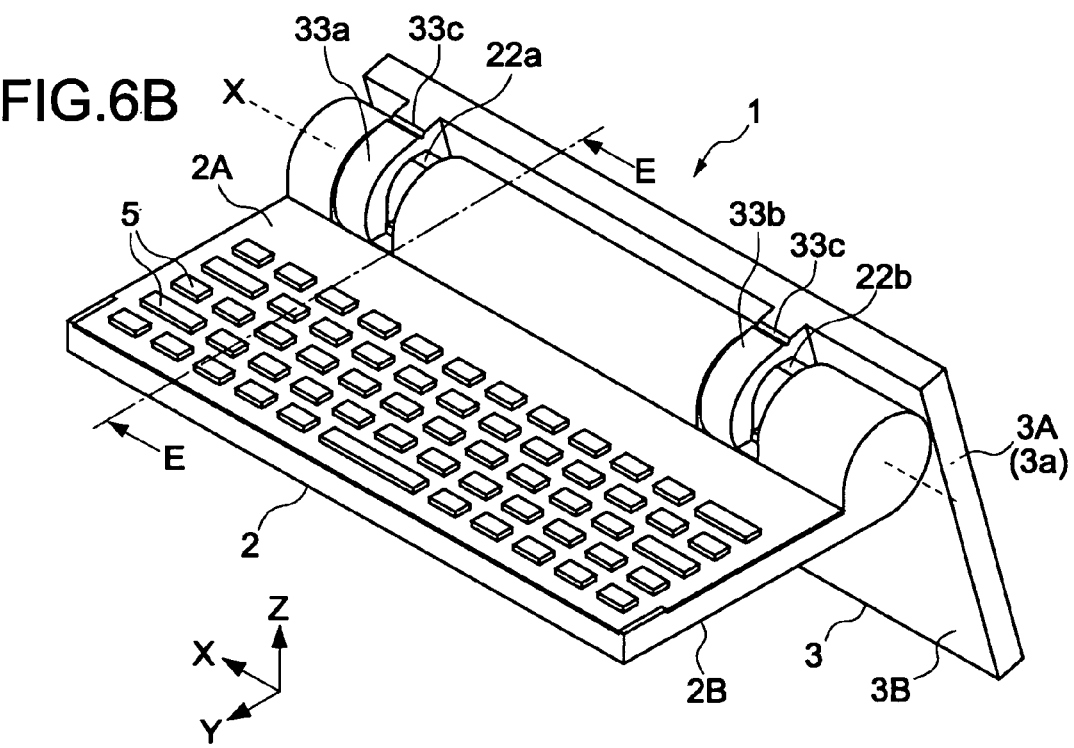

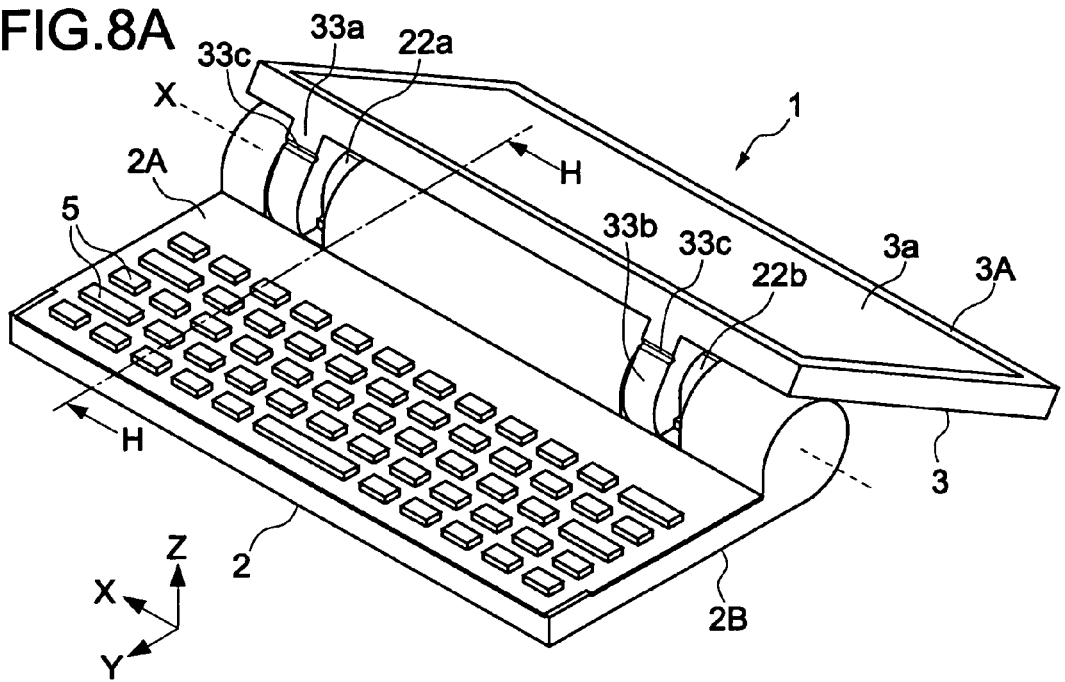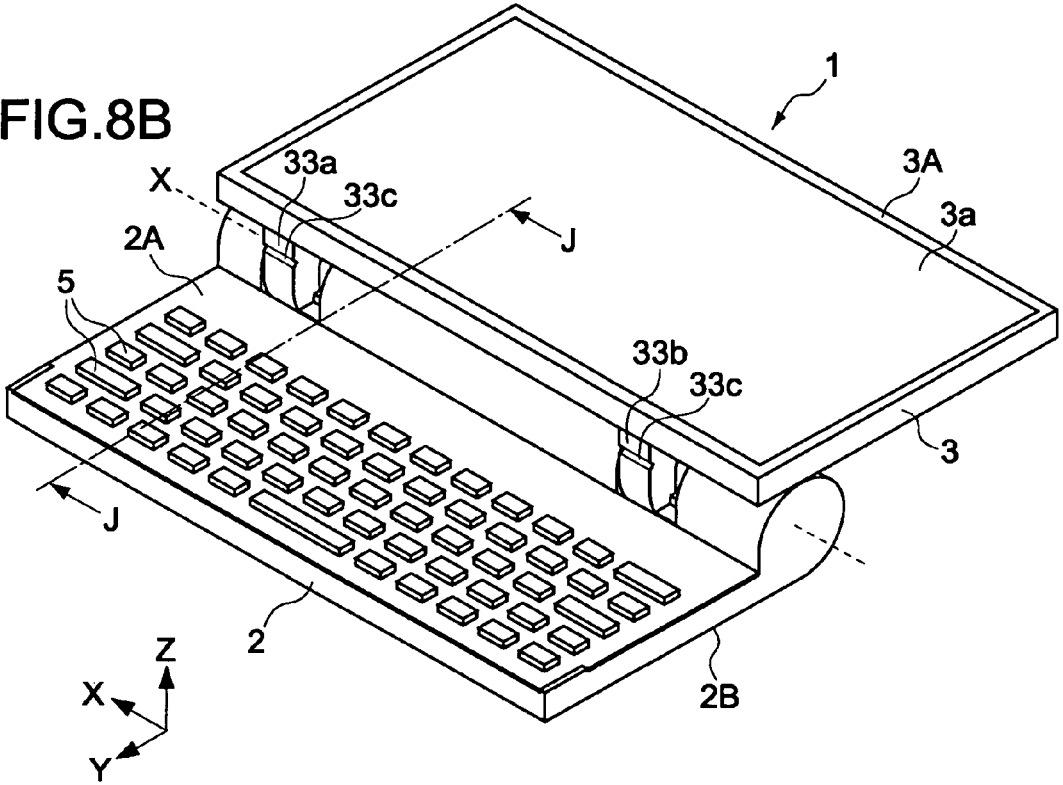

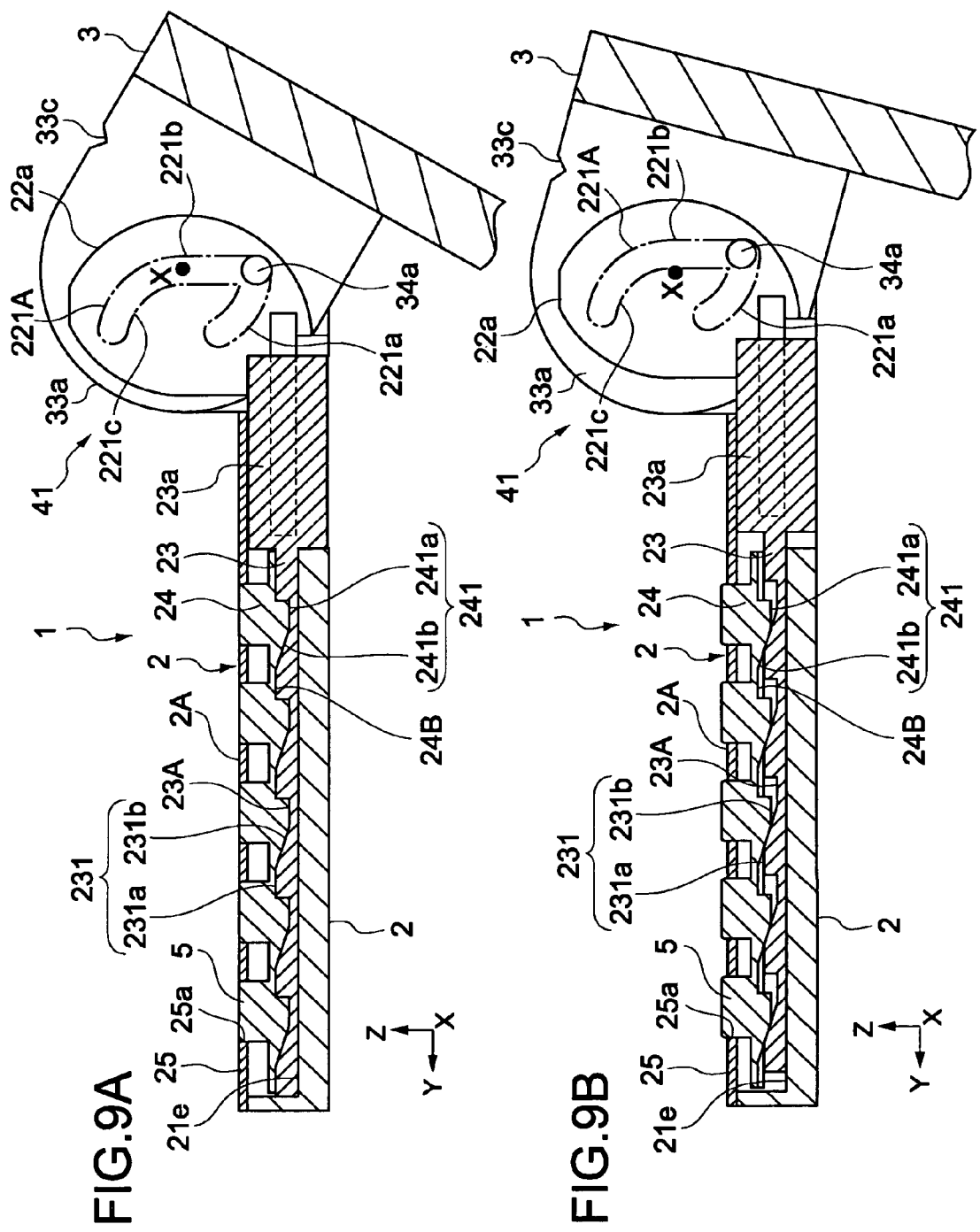

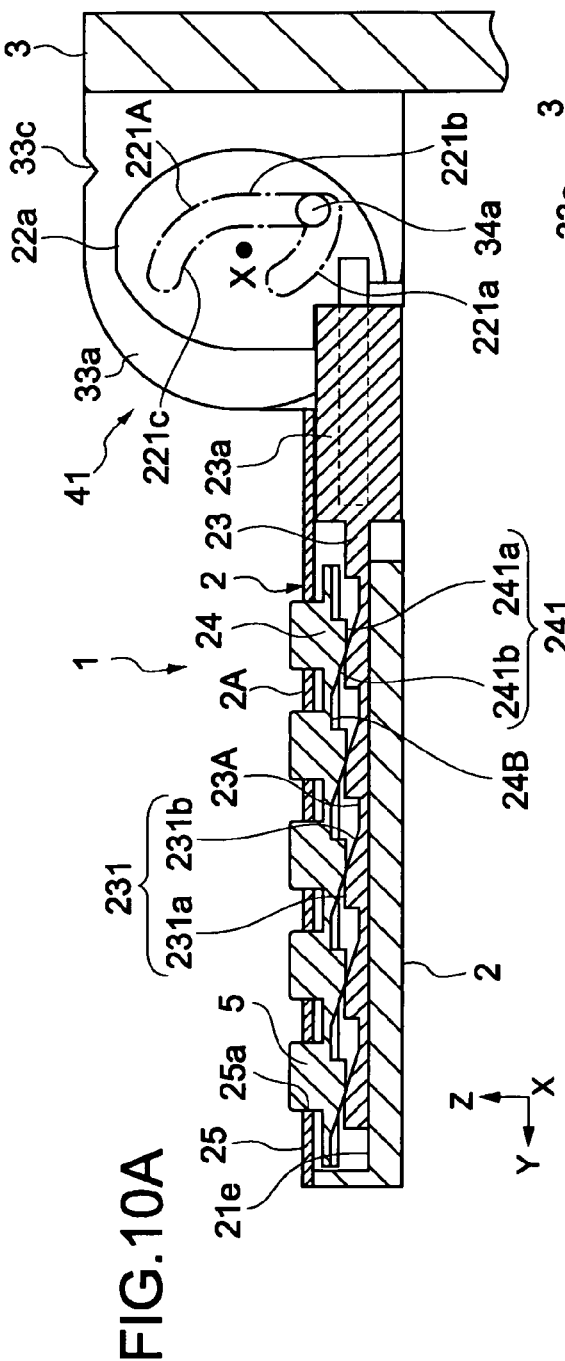
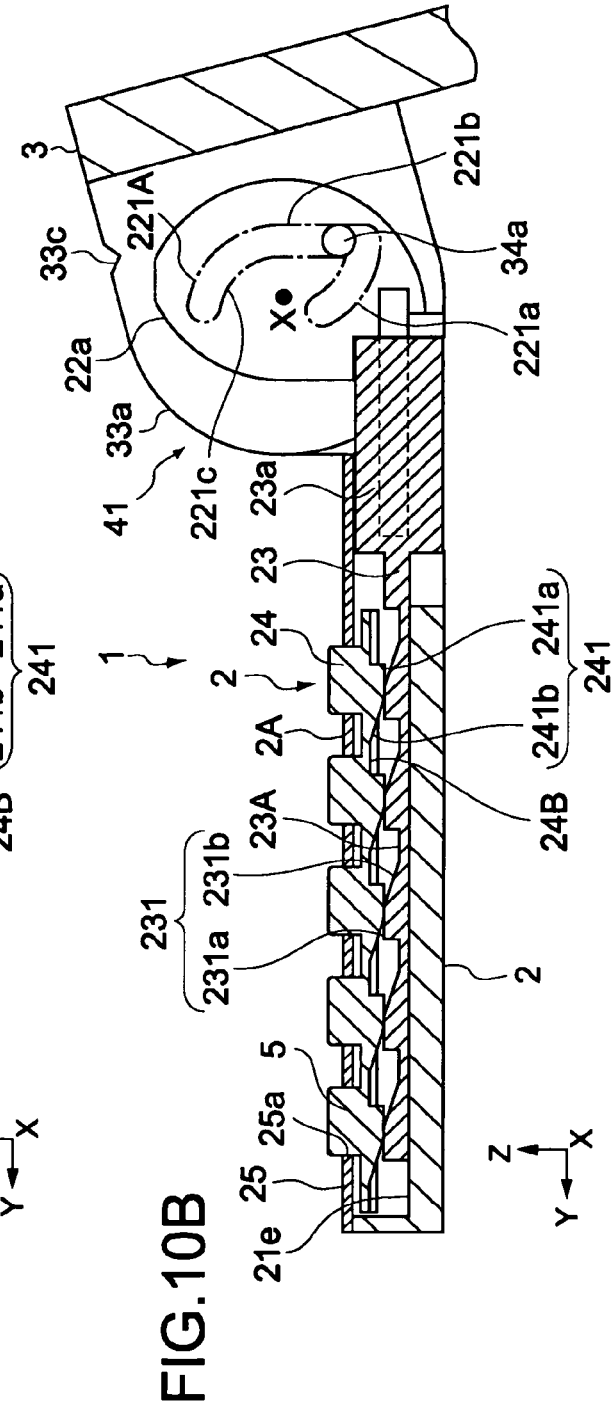
FIG.10A
FIG.10B

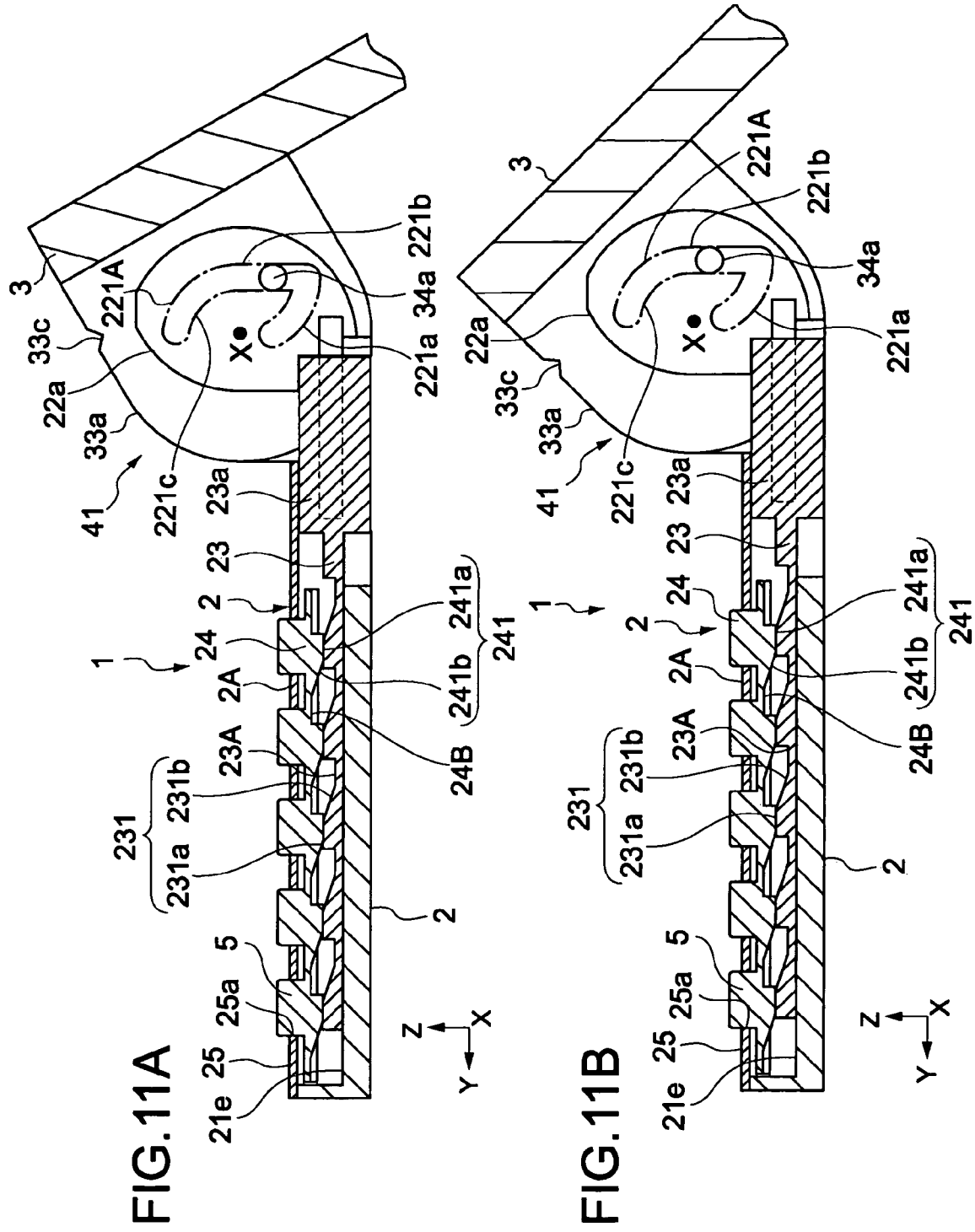

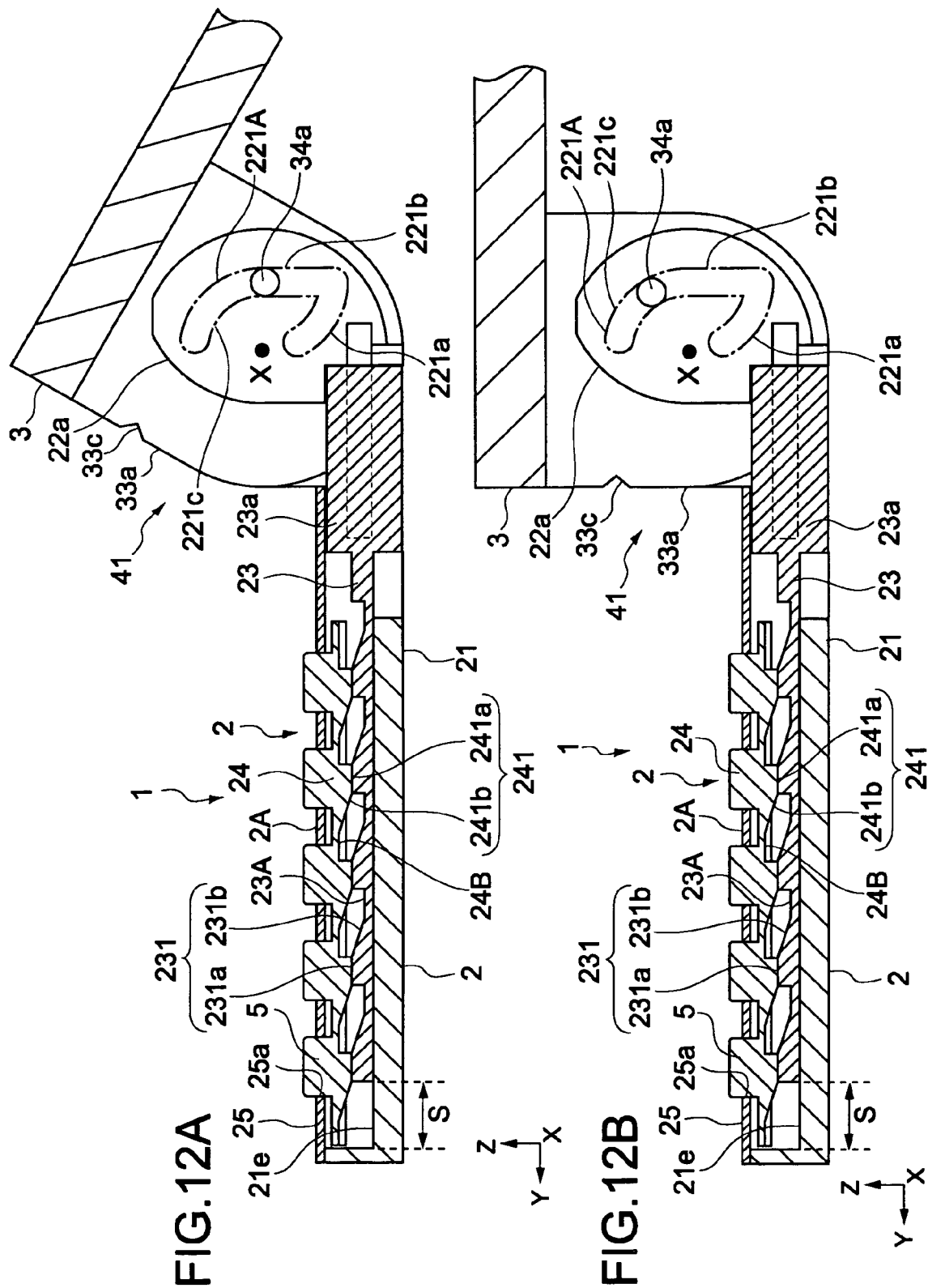

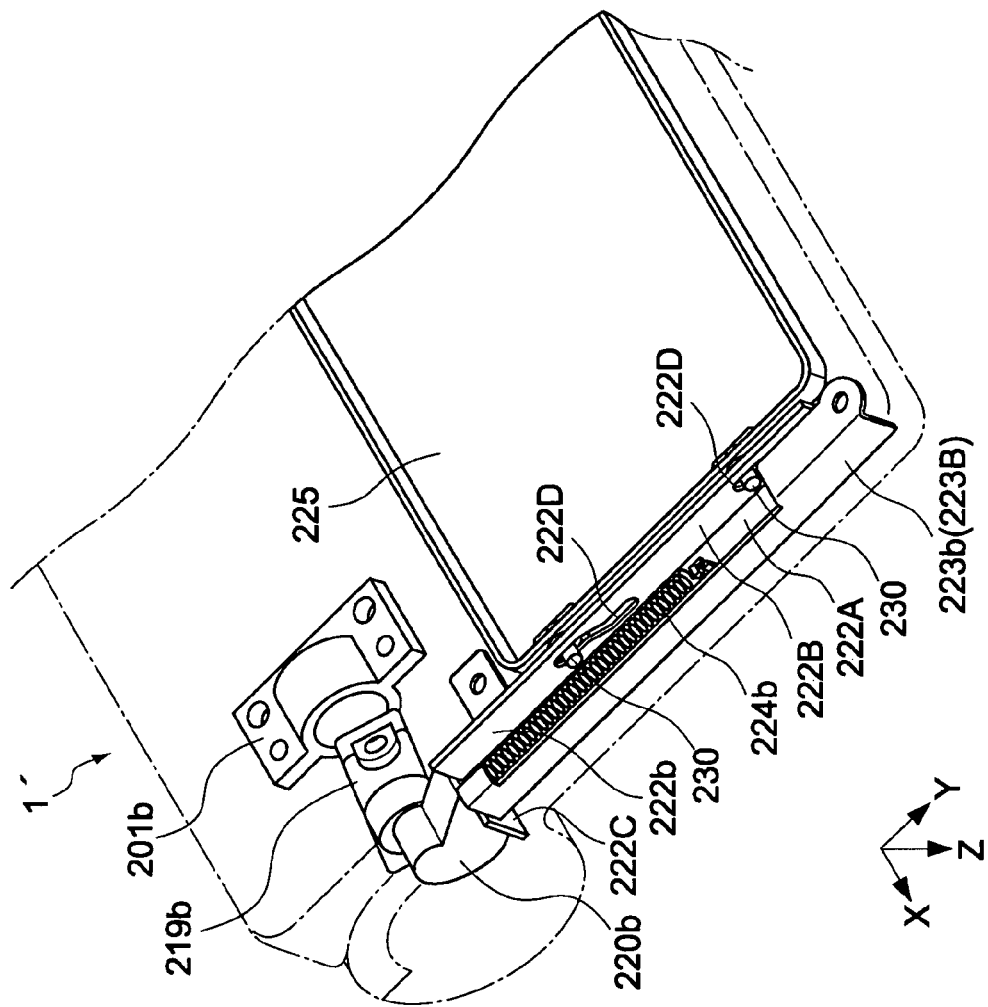
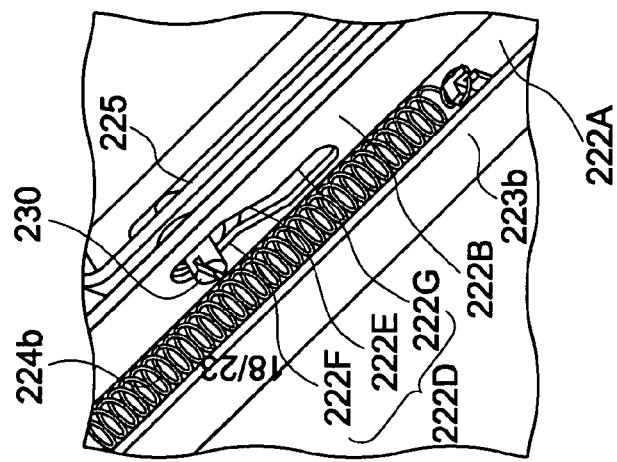
FIG.21A
FIG.21B

ELECTRONIC APPARATUS

CROSS-REFERENCE TO RELATED APPLICATION

The present application claims priority from Japanese Patent Application No. JP 2009-195277 filed in the Japan Patent Office on Aug. 26, 2009, the entire content of which is incorporated herein by reference.

BACKGROUND OF THE INVENTION

1. Field of the Invention

The present invention relates to a foldable electronic apparatus that may include a main body portion including a keyboard or the like and a display portion that displays an image or the like.

2. Description of the Related Art

An electronic apparatus may include a main body portion and a display portion, in which the main body portion includes an input portion such as a plurality of keys, the display portion includes a display screen that displays an image, and can fold the display portion with respect to the main body portion so that the display screen faces the input portion. In a case where the display portion has an input function using a pen or the like on the display screen, it may be difficult to make an input operation using a pen or the like in some cases in a state where the display portion is opened with respect to the main body portion. Therefore, by providing the electronic apparatus with a coupling member that is rotatably provided with respect to the main body portion and the display portion, it becomes possible to inversely fold the display portion with respect to the main body portion so that a back surface of the main body portion faces a back surface of the display portion with two rotational shafts being provided at two positions. With this structure, an input operation using a pen or the like is made easier (for example, see Japanese Patent Application Laid-open No. 07-84677 (paragraph [0004], FIG. 1)).

SUMMARY OF THE INVENTION

However, in the technique described above, the display portion needs to have a coupling mechanism such as a hinge for rotatably coupling the display portion and the coupling member. As a result, there arises a problem that a size of the display portion in a depth or width direction becomes small by a size of the coupling mechanism in the depth direction.

In view of the circumstances as described above, there is a need for an electronic apparatus capable of causing a first back surface that is on an opposite side of a first surface of a display portion to face a second back surface that is on an opposite side of a second surface of a main body portion and setting an angle formed by the first surface of the display portion and the second surface of the main body portion to be a predetermined obtuse angle, while increasing a size of the display screen.

In accordance with an aspect of the present invention, an electronic apparatus is provided which may comprise a main body portion having a main body portion back surface and a keyboard located at a part of the main body portion other than the main body portion back surface, a display portion having a display portion back surface and a display screen on a display surface which is opposite the display portion back surface in which the display surface has a length and a width associated therewith in which the length corresponds to a larger one of the length and the width, and a coupling portion that rotatably couples the main body portion and the display portion between a closed state and an open state or between the open state and the closed state. In the closed state, the main body portion back surface and the display portion back surface face each other and the electronic apparatus is operable as a portable apparatus in which all of the display surface having the display screen except for a relatively small perimeter portion thereof is usable as a display in at least a direction corresponding to the width thereof. In the opened state, the electronic apparatus is operable as a small-sized personal computer.

In the electronic apparatus, the keyboard may be inoperable when in the closed state or, alternatively, the keyboard may be operable to control a number of operations of the display screen when in the closed state.

In the electronic apparatus, the display screen may be usable as a touch panel.

The above electronic apparatus may be operable as a cellular telephone when in the closed state.

In the electronic apparatus the main body portion may have a main body portion length and a main body portion width associated therewith, and the coupling portion may include a mechanism to raise the keyboard while the main body portion and the display portion are being placed in the open state and to lower the keyboard while the main body portion and the display portion are being placed in the closed state such that the keyboard is raised and lowered in a thickness direction which is orthogonal to a plane formed by the main body portion length and the main body portion width.

In the electronic apparatus, the keyboard may include a plurality of keys. Also, in the closed state, an upper surface of each of the plurality of keys and a surface opposite the main body portion back surface may be positioned so as to lie in substantially the same plane, and in the open state the plurality of keys may protrude upward from the surface opposite the main body portion back surface such that the upper surface of each of the plurality of keys may lie in a different plane from that of the surface opposite the main body portion back surface.

In the electronic apparatus, the coupling portion may enable the main body portion and the display portion to rotate more than 180 degrees relative to each other when the main body portion and the display portion are being placed in the open state.

The electronic apparatus may further comprise an engagement portion which restricts rotation of the main body portion and the display portion relative to each other such that in the opened state an angle formed between the display surface and a surface opposite the main body portion back surface lies in a range of more than 90 degrees to less than 180 degrees.

In the electronic apparatus the main body portion may have a main body portion length and a main body portion width associated therewith in which the main body portion length corresponds to a larger one of the main body portion length and the main body portion width, and the coupling portion may have a coupling portion width associated therewith which extends in a direction parallel to that of the main body portion width. The width of the display surface may be substantially equal to a sum of the main body portion width and the coupling portion width.

In accordance with another aspect of the present invention, a foldable electronic apparatus is provided which may comprise a main body portion having a main body portion back surface and a keyboard located at a part of the main body portion other than the main body portion back surface, a display portion having a display portion back surface and a display screen on a display surface which is opposite the display portion back surface, and a coupling portion that rotatably couples the main body portion and the display portion between a closed state and an open state or between the open state and the closed state. The coupling portion may have a first protrusion which protrudes from the display portion back surface in a direction orthogonal to the display portion back surface, a second protrusion which protrudes from a surface opposite the main body portion back surface in a direction orthogonal to the surface opposite the main body portion back surface, and a shaft which rotatably couples the first protrusion and the second protrusion together. In the closed state, the electronic apparatus may have a length extending in a longitudinal direction, a thickness extending in a thickness direction which is orthogonal to the main body portion back surface or the display portion back surface, and a width extending in a width direction which is perpendicular to the longitudinal direction and to the thickness direction. Also, the main body portion may have a main body portion width which extends in the width direction, the coupling portion may have a coupling portion width which extends in the width direction, and the display portion may have a display portion width which extends in the width direction. The display portion width may be substantially equal to a sum of the main body portion width and the coupling portion width. In the closed state, the main body portion back surface and the display portion back surface may face each other and the electronic apparatus may be operable as a portable apparatus in which all of the display surface except for a relatively small perimeter portion thereof is usable as the display screen in the width direction. In the opened state, the electronic apparatus may be operable as a small-sized personal computer.

In the foldable electronic apparatus the coupling portion may have another first protrusion protruding from the display portion back surface in the direction orthogonal to the display portion back surface so as to have two first protrusions which are spaced apart from each other in the longitudinal direction, another second protrusion protruding from the surface opposite the main body portion back surface in the direction orthogonal to the surface opposite the main body portion back surface so as to have two second protrusions which are spaced apart from each other in the longitudinal direction, and another shaft which rotatably couples the other first protrusion and the other second protrusion together. One of the two first protrusions, one of the two second protrusions and one shaft may form a first coupling mechanism and another one of the first protrusions, another one of the second protrusions and the other shaft may form a second coupling mechanism. A battery accommodation portion for holding a battery may be arranged between the first coupling mechanism and the second coupling mechanism.

In the electronic apparatus, the keyboard may be changeable between a first state and a second state or between the second state and the first state such that when the main body portion and the display portion are in the closed state the keyboard is in the first state and when the main body portion and the display portion are in the open state the keyboard is in the second state, in which the first state is different from the second state.

In accordance with yet another aspect of the present invention, a foldable electronic apparatus is provided which may comprise a main body portion, a display portion having a display surface in which the display surface has a length and a width associated therewith in which the length corresponds to a larger one of the length and the width, and a coupling portion that rotatably couples the main body portion and the display portion between a closed state and an open state or between the open state and the closed state. In the closed state, back surfaces of the main body portion and the display portion may face each other and the electronic apparatus may be operable as a portable apparatus in which all of the display surface having the display screen except for a relatively small perimeter portion thereof may be usable as a display in at least a direction corresponding to the width thereof. In the opened state, the electronic apparatus may be operable as a small-sized personal computer.

The above foldable electronic apparatus may further comprise a device to enable the user to perform an input operation which is located on a surface other than the display surface.

According to at least one embodiment of the present invention, an apparatus is provided which may enable a first back surface that is on an opposite side of a first surface of a display portion to face a second back surface that is on an opposite side of a second surface of a main body portion and an angle formed by the first surface of the display portion and the second surface of the main body portion to be set to be a predetermined obtuse angle, while increasing a size of the display screen.

These and other objects, features and advantages of the present invention will become more apparent in light of the following detailed description of best mode embodiments thereof, as illustrated in the accompanying drawings.

BRIEF DESCRIPTION OF DRAWINGS

FIG. 5A is a perspective view showing a state where a display portion is rotated by 60 degrees with respect to a main body portion of the electronic apparatus shown in FIG. 1, and FIG. 5B is a perspective view showing a state where keys start to protrude from the main body portion;

FIG. 6A is a perspective view showing a state where the display portion is perpendicular to the main body portion, and FIG. 6B is a perspective view of a state where the keys are completely raised from the main body portion;

FIG. 8A is a perspective view showing an end state of the operation for fixing the positions of the keys, and FIG. 8B is a perspective view showing a state where the display portion is parallel to the main body portion;

FIG. 9A is a cross-sectional view of the electronic apparatus taken along the line B-B of FIG. 5A, and FIG. 9B is a cross-sectional view of the electronic apparatus taken along the line C-C of FIG. 5B;

FIG. 10A is a cross-sectional view of the electronic apparatus taken along the line D-D of FIG. 6A, and FIG. 10B is a cross-sectional view of the electronic apparatus taken along the line E-E of FIG. 6B;

FIG. 11A is a cross-sectional view of the electronic apparatus taken along the line F-F of FIG. 7A, and FIG. 11B is a cross-sectional view of the electronic apparatus taken along the line G-G of FIG. 7B;

FIG. 12A is a cross-sectional view of the electronic apparatus taken along the line H-H of FIG. 8A, and FIG. 12B is a cross-sectional view of the electronic apparatus taken along the line J-J of FIG. 8B;

FIG. 21 is a perspective view showing the inside of the electronic apparatus with the display portion being closed, seen from a bottom surface side;

DESCRIPTION OF PREFERRED EMBODIMENTS

Hereinafter, embodiments of the present invention will be described with reference to the drawings.

First Embodiment

Structure of Electronic Apparatus

Figure 1:
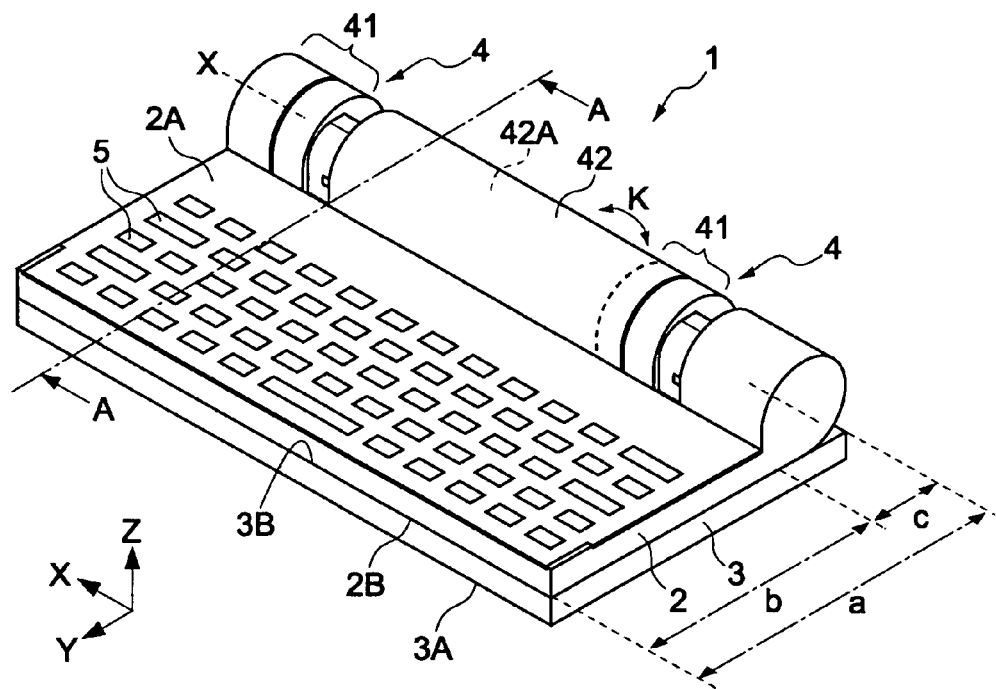
FIG. 1 is a perspective view showing a closed state of an electronic apparatus according to a first embodiment of the present invention.
Figure 2:
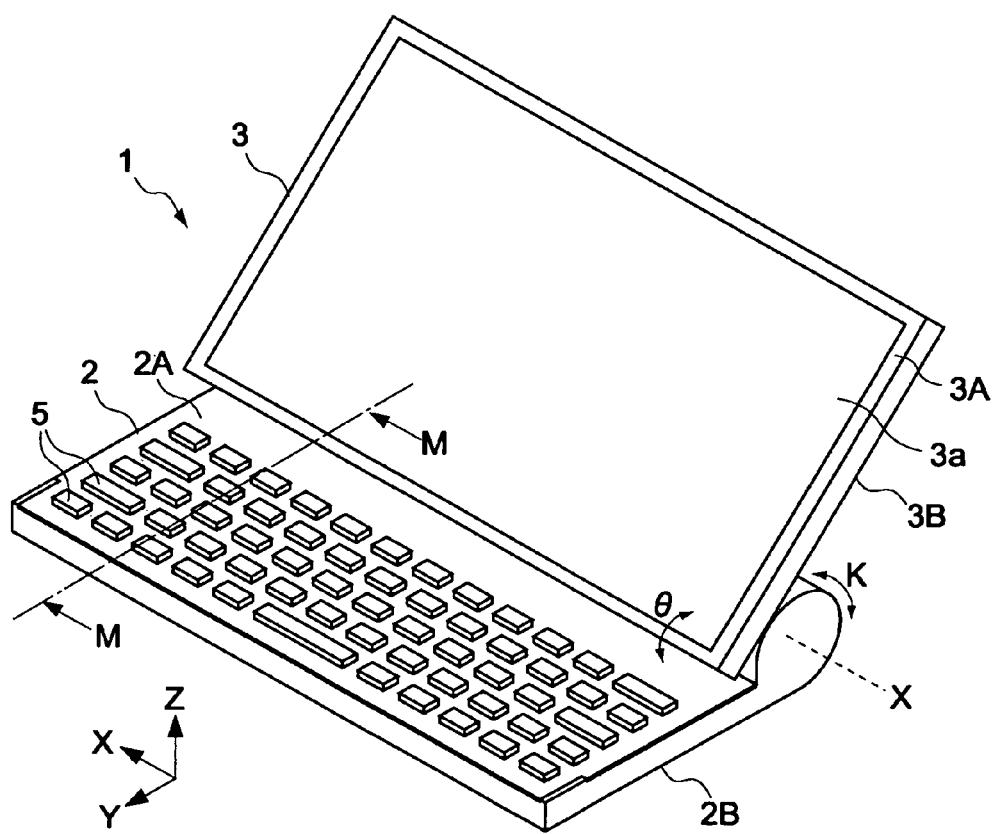
FIG. 2 is a perspective view showing an opened state of the electronic apparatus shown in FIG. 1.

FIG. 1 is a perspective view showing a closed state of an electronic apparatus according to a first embodiment of the present invention, and FIG. 2 is a perspective view showing an opened state of the electronic apparatus shown in FIG. 1.

As shown in FIGS. 1 and 2, an electronic apparatus 1 includes a main body portion 2, a display portion 3, and a coupling portion 4 that rotatably couples the main body portion 2 and the display portion 3.

The main body portion 2 includes a surface 2A, a back surface 2B that forms a surface on the opposite side of the surface 2A, and built-in components (to be described later) that are incorporated in the main body portion 2. The display portion 3 incorporates a liquid crystal panel including a display screen 3a that can display an image or the like. The display portion 3 includes a surface 3A including the display screen 3a and a back surface 3B that forms a surface on the opposite side of the surface 3A. The display screen 3a is provided in substantially the entire area of the surface 3A. In other words and as illustrated in FIG. 2, the display screen 3a may occupy all of the display surface 3A except for a relatively small perimeter or rim portion thereof which may exist in one or both directions of such surface, in which one such direction may correspond to a length of such surface and another such direction may correspond to a width of such surface. The length may lie along an X or longitudinal direction shown in FIG. 1 and the width may lie along a Y direction shown in FIG. 1. A dimension of such length may be larger than a dimension of such width. As a result, all of the display surface 3A except for the relatively small perimeter or rim portion thereof may be usable as a display in at least one direction which may correspond to the length of such surface or the width of such surface. The display portion 3 is rotatable in an arrow direction K about a rotational axis X that is an axis of rotation of the display portion 3 with respect to the main body portion 2. Specifically, the display portion 3 is rotatable between a state where the display portion 3 is closed with respect to the main body portion 2 shown in FIG. 1 and a state where the display portion 3 is opened with respect to the main body portion 2 shown in FIG. 2. An angle θ formed by the display screen 3a of the display portion 3 with respect to the surface 2A of the main body portion 2 is, for example, 0 degrees in FIG. 1 and 120 degrees in FIG. 2. It should be noted that the angle θ is not particularly limited as long as it is larger than 90 degrees.

In the state where the display portion 3 is closed with respect to the main body portion 2, the back surface 2B of the main body portion 2 and the back surface 3B of the display portion 3 face each other as shown in FIG. 1. In the closed state, a plurality of keys 5 that are provided to the main body portion 2 do not protrude from the surface 2A of the main body portion 2. In other words, upper surfaces of the plurality of keys 5 and the surface 2A of the main body portion 2 are positioned on substantially the same plane (XY plane) in the closed state, for example.

In the state where the display portion 3 is opened with respect to the main body portion 2, the keys 5 protrude from the surface 2A of the main body portion 2 in a thickness direction of the main body portion 2 (Z direction of FIG. 2) as shown in FIG. 2.

The coupling portion 4 includes a pair of coupling mechanisms 41 (to be described later) that are provided on a deep side of a depth or width direction (Y direction of FIG. 1) orthogonal to a longitudinal or length direction of the main body portion 2 (X direction of FIG. 1) and on the back surface 3B side of the display portion 3. The pair of coupling mechanisms 41 are spaced away from each other in the axial direction of the rotational axis X that is parallel to the longitudinal direction of the main body portion 2. A substantially-columnar battery accommodation portion 42 that accommodates a substantially-columnar battery 42A is disposed between the pair of coupling mechanisms 41. A size a of the display portion 3 in the depth or width direction is substantially the same as a sum of a size b of the surface 2A of the main body portion 2 in the depth or width direction and a size c of the coupling portion 4 in the depth or width direction.

The length of various portions or parts of electronic apparatus (such as display portion 3 as previously indicated) may lie along the X or longitudinal direction such as that shown in FIG. 1 and the width thereof may lie along the Y direction such as that shown in FIG. 1. As such, the depth direction may also be considered a width direction. Further, the length of a portion or part of the electronic apparatus may have a dimension which is larger than that of the width thereof.

Figure 3:
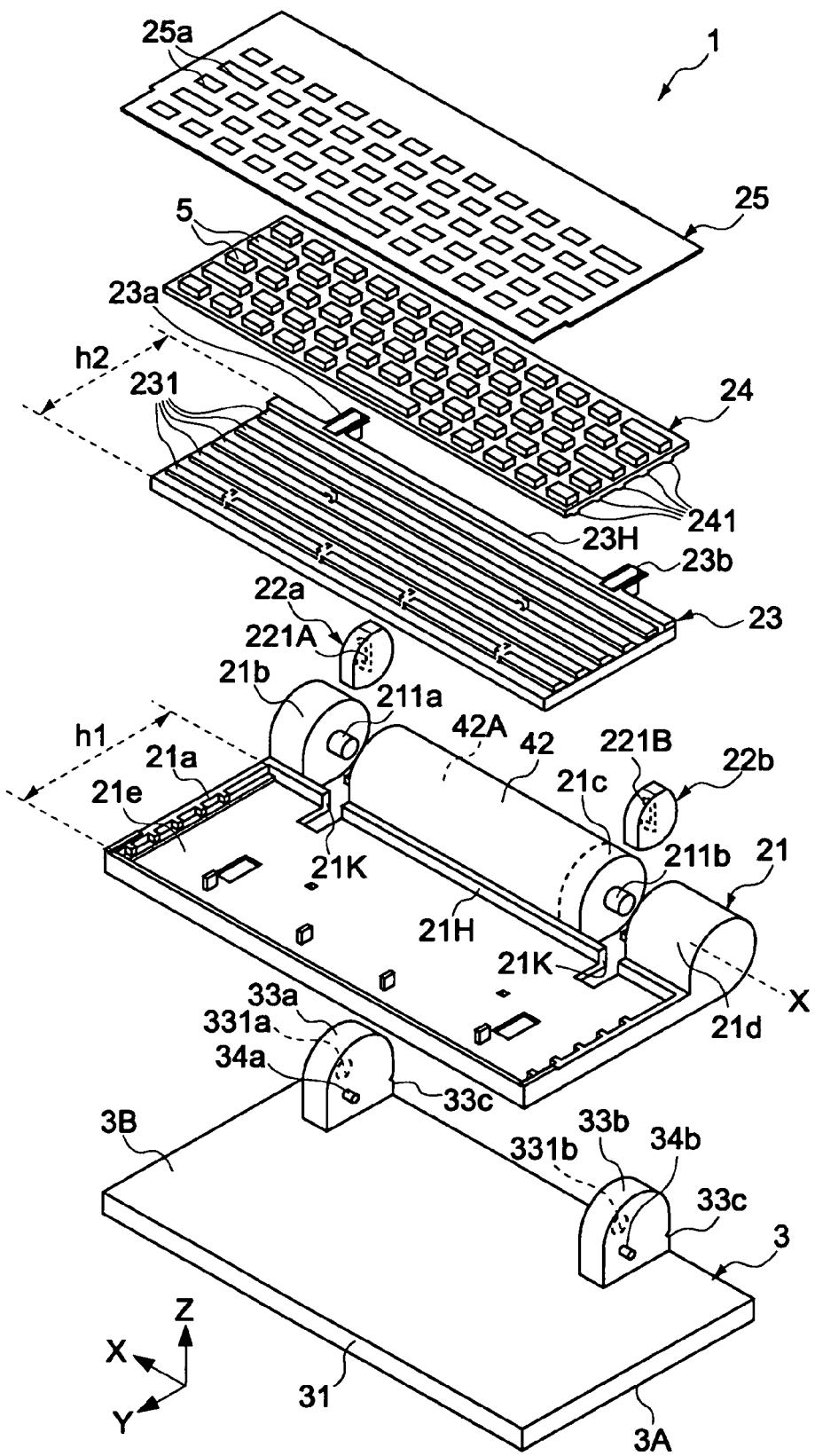
FIG. 3 is an exploded perspective view of the electronic apparatus shown in FIG. 1.
Figure 4:
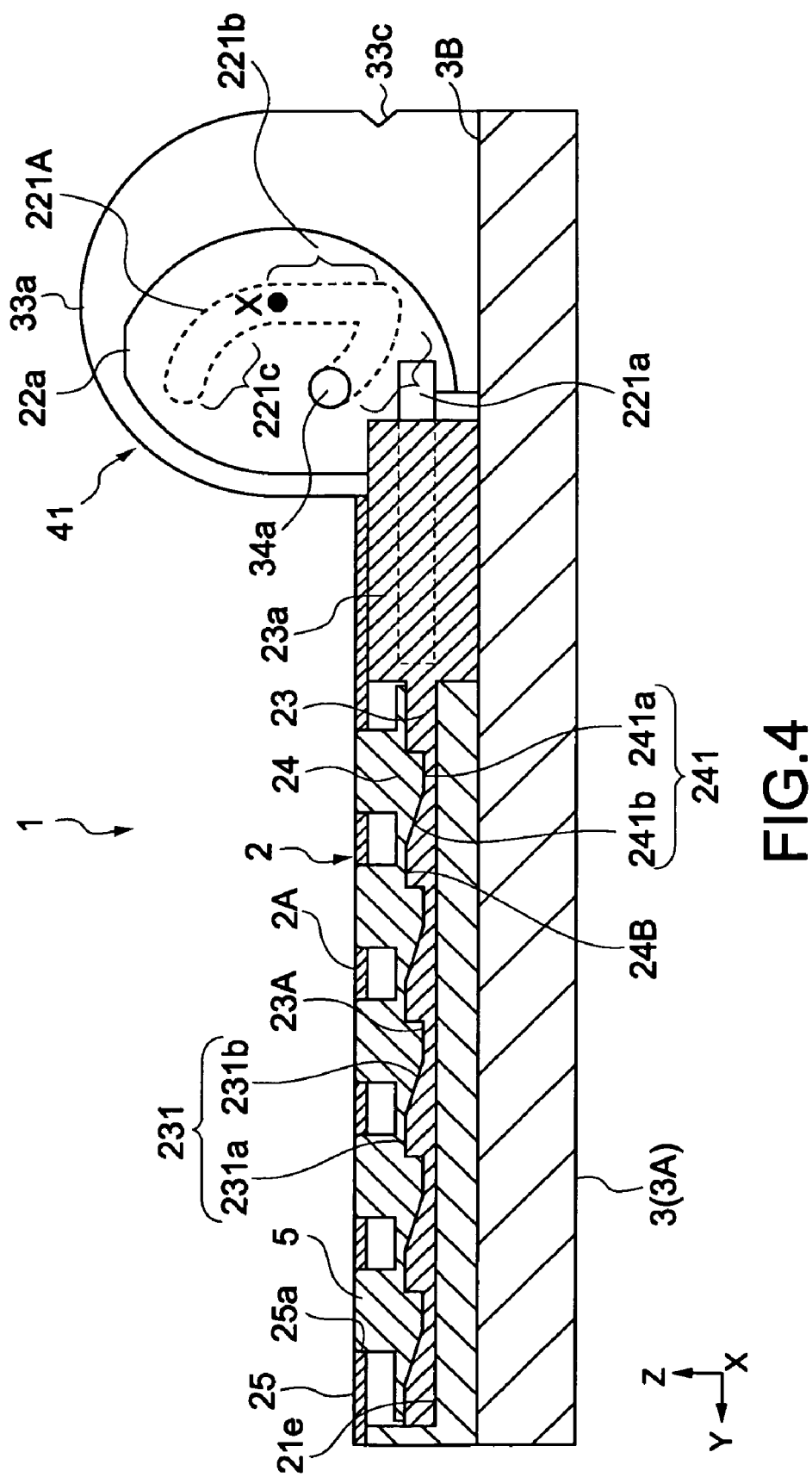
FIG. 4 is a cross-sectional view of the electronic apparatus taken along the line A-A of FIG. 1.

FIG. 3 is an exploded perspective view of the electronic apparatus 1 shown in FIG. 1, and FIG. 4 is a cross-sectional view of the electronic apparatus 1 taken along the line A-A of FIG. 1.

The electronic apparatus 1 includes the display portion 3, and a key-portion cabinet 21, a pair of slide cams 22a and 22b, a slider 23, a keyboard unit 24, and a key cover 25 that constitute the main body portion 2.

The display portion 3 includes a casing 31 that accommodates a liquid crystal panel or the like. The display portion 3 has a function of displaying an image or the like and a function as a capacitive or resistive touch panel.

First protrusions 33a and 33b are provided in a protruding manner to the back surface 3B of the display portion 3 on the deep side of the depth direction (Y direction). The first protrusions 33a and 33b are spaced away from each other in the axial direction of the rotational axis X. The first protrusions 33a and 33b respectively constitute part of the coupling mechanisms 41 shown in FIG. 1. Each of the first protrusions 33a and 33b has a substantially disc shape. A pin 34a is provided to a side surface of the first protrusion 33a in a protruding manner along the axial direction of the rotational axis X. A pin 34b is provided to a side surface of the first protrusion 33b in a protruding manner along the axial direction of the rotational axis X. The pins 34a and 34b are provided in a protruding manner on the same axis at positions deviated from the rotational axis X of the display portion 3. Provided to the first protrusions 33a and 33b are bearing portions 331a and 331b, respectively, each of which serves as a bearing for being coupled with the key-portion cabinet 21. As shown in FIG. 4, the first protrusions 33a and 33b are provided with the bearing portions 331a and 331b at positions protruding from the surface 2A in the Z direction that is orthogonal to the back surface 3B of the display portion 3.

On a rear surface side of each of the first protrusions 33a and 33b, an engagement groove 33c as an engagement portion is formed. The engagement groove 33c has a substantially-V-shaped cross section and is formed over the entire area to extend in a direction along the rotational axis X. The engagement groove 33c is a groove for restricting the rotation of the display portion 3 by engaging with an end portion of the key cover 25 when the display portion 3 is opened with respect to the main body portion 2 as shown in FIG. 2 (see FIGS. 5 and 13 to be described later).

The key-portion cabinet 21 includes a rectangular placement portion 21a in which the slider 23 and the keyboard unit 24 are accommodated, second protrusions 21b and 21c that respectively constitute part of the coupling mechanisms 41, a columnar end portion 21d, and the battery accommodation portion 42.

The placement portion 21a includes an inner bottom surface 21e on which the slider 23 is placed. A length of the inner bottom surface 21e in the depth direction (Y direction) is h1. A pair of notch portions 21K are formed away from each other in the longitudinal direction of the main body portion 2 (X direction) on a side wall 21H of the placement portion 21a.

A shaft 211a protrudes from a side surface of the second protrusion 21b in the axial direction of the rotational axis X, and a shaft 211b protrudes from a side surface of the second protrusion 21c in the axial direction of the rotational axis X. The shafts 211a and 211b are formed on the same axis as the rotational axis X. In other words, the shaft direction of the shafts 211a and 211b is the same direction as that of the pins 34a and 34b described above, but the positions of the shafts 211a and 211b on the YZ plane are deviated with respect to the pins 34a and 34b. The shafts 211a and 211b are fitted into the bearing portions 331a and 331b, respectively, which are formed in the first protrusions 33a and 33b. As shown in FIG. 4, the rotational axis X (shafts 211a and 211b of FIG. 3) is provided so as to protrude from (the XY plane including) the surface 2A of the main body portion 2 in the Z direction that is orthogonal to the surface 2A.

The columnar end portion 21d is provided at an end portion (right-side end) on the same axis as the rotational axis X. The columnar end portion 21d accommodates, for example, a power switch (not shown). In the battery accommodation portion 42, batteries 42A having substantially the same shape as the battery accommodation portion 42 are accommodated with almost no spaces therebetween.

Between the second protrusion 21b and the battery accommodation portion 42, a gap in which the first protrusion 33a and the slide cam 22a are placed is formed. Between the second protrusion 21c and the columnar end portion 21d, a gap in which the first protrusion 33b and the slide cam 22b are placed is formed.

The slide cam 22a is placed between the first protrusion 33a and the battery accommodation portion 42, and the slide cam 22b is placed between the first protrusion 33b and the columnar end portion 21d. Formed in the slide cams 22a and 22b are cam grooves 221A and 221B, respectively, each of which serves as a second engagement portion (see FIG. 4). The pin 34a of the first protrusion 33a is fitted into the cam groove 221A, and the pin 34b of the first protrusion 33b is fitted into the cam groove 221B. It should be noted that through-holes into which the pins 34a and 34b are fitted and that have the same shape as the cam grooves 221A and 221B may be formed in the slide cams 22a and 22b, instead of the cam grooves 221A and 221B.

The cam groove 221A and the cam groove 221B have the same shape. The cam groove 221A and the cam groove 221B are formed so that the positions thereof correspond to each other in the direction along the rotational axis X. The cam groove 221A is constituted of a first arc-shaped groove 221a, a linear groove 221b connecting to the first arc-shaped groove 221a, and a second arc-shaped groove 221c connecting to the linear groove 221b, as shown in FIG. 4. The first arc-shaped groove 221a is formed along a trail of a movement of the pin 34a when the pin 34a rotates about the rotational axis X. The linear groove 221b is almost linearly formed in the thickness direction of the electronic apparatus 1 (Z direction of FIG. 4). The second arc-shaped groove 221c is formed along the trail of the movement of the pin 34a when the pin 34a rotates about the rotational axis X.

The slider 23 is accommodated in the placement portion 21a of the key-portion cabinet 21. The slider 23 has a substantially rectangular plate shape and a length h2 in the depth direction (Y direction). The length h2 is shorter than the length h1 of the inner bottom surface 21e of the placement portion 21a of the key-portion cabinet 21. The slider 23 includes a pair of cam-fixing portions 23a and 23b that protrude in the depth direction (Y direction) on a rear surface 23H side thereof. In a state where the display portion 3 is closed as shown in FIG. 4, the rear surface 23H of the slider 23 within the placement portion 21a shown in FIG. 3 and the side wall 21H of the placement portion 21a are spaced away from each other in the depth direction (Y direction).

The slide cams 22a and 22b are fixed to the cam-fixing portions 23a and 23b of the slider 23 (see FIG. 4). An upper end of the slider 23 comes into contact with the key cover 25, and the bottom surface side of the slider 23 comes into contact with the inner bottom surface 21e of the placement portion 21a. With this structure, the movement of the slider 23 in the thickness direction (Z direction of FIG. 4) is restricted. When the display portion 3 is rotated with respect to the main body portion 2 about the rotational axis X, the pins 34a and 34b are rotated about the rotational axis X and the slide cams 22a and 22b and the slider 23 integrally slide in the depth direction (Y direction of FIG. 4) in conjunction with the rotation of the pins 34a and 34b. The cam-fixing portions 23a and 23b are formed so as to correspond to the pair of notch portions 21K in the longitudinal direction of the main body portion 2 (X direction). The cam-fixing portions 23a and 23b are allowed to slide in the depth direction (Y direction) along with the slide of the slider 23 in the depth direction (Y direction) by the pair of notch portions 21K.

On an upper surface side of the slider 23, a plurality of first wedge-shaped protrusions 231 are arranged in the depth direction so as to respectively correspond to the keys 5 arranged in the depth direction. The first wedge-shaped protrusions 231 are provided so as to protrude from an upper surface 23A of the slider 23 and arranged almost over the entire area of the slider 23 in the longitudinal direction (X direction). Each of the first wedge-shaped protrusions 231 includes an upper end surface 231a and a first tilted surface 231b. The upper end surface 231a is provided parallel to the upper surface 23A at a higher position than the upper surface 23A in the thickness direction. The first tilted surface 231b is tilted to be lowered from the upper end surface 231a to the upper surface 23A on the deep side of the depth direction of the upper end surface 231a. A height of the upper end surface 231a from the upper surface 23A is adjusted as appropriate in accordance with a height by which the keyboard unit 24 is raised/lowered in the thickness direction (Z direction). A tilt angle of the first tilted surface 231b is adjusted as appropriate in accordance with a slide amount of the slider 23 when the display portion 3 is rotated.

The keyboard unit 24 is provided with the plurality of keys 5 on the upper surface side thereof in a protruding manner such that a user can press the plurality of keys 5. The keyboard unit 24 is accommodated in the placement portion 21a of the key-portion cabinet 21 so as to overlap the slider 23. In the state where the display portion 3 is closed with respect to the main body portion 2 as shown in FIG. 4, the upper surface 23A of the slider 23 comes into contact with a bottom surface 24B of the keyboard unit 24 with almost no space therebetween. In other words, on the bottom surface 24B side of the keyboard unit 24, a plurality of second wedge-shaped protrusions 241 are provided in a protruding manner in the depth direction so as to respectively correspond to the keys 5 arranged in the depth direction. The second wedge-shaped protrusions 241 are arranged almost over the entire area of the keyboard unit 24 in the longitudinal direction (X direction).

Each of the second wedge-shaped protrusions 241 includes a lower end surface 241a and a second tilted surface 241b. The lower end surface 241a is provided parallel to the bottom surface 24B at a position closer to the slider 23 than the bottom surface 24B in the thickness direction. A length of the lower end surface 241a in the depth direction (Y direction) is equal to the length of the upper end surface 231a in the depth direction (Y direction) (see FIG. 12A). The second tilted surface 241b is tilted from one end of the lower end surface 241a in the depth direction. The tilt has a direction rising from the lower end surface 241a to the bottom surface 24B. A height of the lower end surface 241a from the bottom surface 24B is adjusted as appropriate in accordance with a height by which the keyboard unit 24 is raised/lowered in the thickness direction (Z direction). Specifically, the height of the lower end surface 241a from the bottom surface 24B is equal to the height of the upper end surface 231a from the upper surface 23A. A tilt angle of the second tilted surface 241b is adjusted as appropriate in accordance with the slide amount of the slider 23 when the display portion 3 is rotated. Specifically, the second tilted surface 241b is parallel to the first tilted surface 231b.

In the state where the display portion 3 is closed with respect to the main body portion 2 as shown in FIG. 4, the keys 5 are inserted into openings 25a that are formed in the key cover 25 and do not protrude from an upper surface of the key cover 25 in the thickness direction.

Opening/Closing Operation

Next, an opening/closing operation of the display portion 3 with respect to the main body portion 2 in the electronic apparatus 1 described above will be described.

FIG. 5A is a perspective view showing a state where the display portion 3 is rotated by 60 degrees with respect to the main body portion 2 of the electronic apparatus 1 shown in FIG. 1, and FIG. 5B is a perspective view showing a state where the keys 5 start to protrude from the main body portion 2. FIG. 9A is a cross-sectional view of the electronic apparatus 1 taken along the line B-B of FIG. 5A, and FIG. 9B is a cross-sectional view of the electronic apparatus 1 taken along the line C-C of FIG. 5B.

The display portion 3 is rotated so that an angle θ2 of the back surface 3B of the display portion 3 with respect to the back surface 2B of the main body portion 2 becomes 60 degrees as shown in FIG. 5A from the state where the display portion 3 is closed with respect to the main body portion 2 as shown in FIG. 1.

At this time, as shown in FIG. 9A, the pin 34a is moved within the first arc-shaped groove 221a of the cam groove 221A of the slide cam 22a from one end position of the first arc-shaped groove 221a shown in FIG. 4 to the other end position of the first arc-shaped groove 221a shown in FIG. 9A. Since the first arc-shaped groove 221a is formed along the trail of the movement of the pin 34a, the pin 34a is moved within the first arc-shaped groove 221a.

In this case, since a force from the pin 34a does not act on the slide cam 22a, the slide cam 22a and the slider 23 are not moved in the depth direction (Y direction). As a result, the upper surface 23A side of the slider 23 and the bottom surface 24B side of the keyboard unit 24 are still brought into contact with each other with almost no spaces therebetween. It should be noted that the same holds true for an operation on the pin 34b side and therefore a description thereof will be omitted (hereinafter, the same holds true for a description of the operation). Further, in this case, the keys 5 do not protrude from the surface 2A of the main body portion 2. In other words, the surface 2A side of the main body portion 2 is almost flat.

Next, the display portion 3 is additionally rotated with respect to the main body portion 2 as shown in FIG. 5B from the state shown in FIG. 5A.

At this time, the pin 34a that is rotated about the rotational axis X presses the slide cam 22a in the linear groove 221b as shown in FIG. 9B. Accordingly, the pin 34a causes the slide cam 22a to slide to the deep side of the depth direction (Y direction of FIG. 9). Since the slide cam 22a is fixed to the slider 23, the slider 23 starts to slide integrally with the slide cam 22a to the deep side of the depth direction (Y direction of FIG. 9). Since the upper surface 23A side of the slider 23 and the bottom surface 24B side of the keyboard unit 24 are arranged with almost no space therebetween before the slider 23 starts to slide, the first tilted surface 231b of the slider 23 starts to slide along the second tilted surface 241b of the keyboard unit 24 almost simultaneously with the start of the slide of the slider 23. Accordingly, the slider 23 raises the keyboard unit 24 in the thickness direction (Z direction of FIG. 9B). As a result, the keys 5 starts to be raised from the surface 2A of the main body portion 2.

FIG. 6A is a perspective view showing a state where the display portion 3 is perpendicular to the main body portion 2, and FIG. 6B is a perspective view of a state where the keys 5 are completely raised from the main body portion 2. FIG. 10A is a cross-sectional view of the electronic apparatus 1 taken along the line D-D of FIG. 6A, and FIG. 10B is a cross-sectional view of the electronic apparatus 1 taken along the line E-E of FIG. 6B.

The display portion 3 is additionally rotated with respect to the main body portion 2 as shown in FIG. 6A from the state shown in FIG. 5B.

At this time, the pin 34a that is rotated about the rotational axis X presses the slide cam 22a in the linear groove 221b as shown in FIG. 10A. Accordingly, the slide cam 22a additionally slides to the deep side of the depth direction (Y direction). Along with this slide, the slider 23 additionally slides in the depth direction integrally with the slide cam 22a. At this time, the first tilted surface 231b of the slider 23 slides along the second tilted surface 241b of the keyboard unit 24. Accordingly, the slider 23 additionally raises the keyboard unit 24 in the thickness direction (Z direction) (FIG. 10A). As a result, the keys 5 are additionally raised from the surface 2A of the main body portion 2.

Next, the display portion 3 is additionally rotated with respect to the main body portion 2 as shown in FIG. 6B from the state shown in FIG. 6A.

Accordingly, the pin 34a that is rotated about the rotational axis X presses the slide cam 22a in the linear groove 221b as shown in FIG. 10B. Accordingly, the slide cam 22a additionally slides to the deep side of the depth direction (Y direction). Thus, the slider 23 fixed to the slide cam 22a additionally slides to the deep side of the depth direction. At this time, the first tilted surface 231b of the slider 23 slides along the second tilted surface 241b of the keyboard unit 24. Accordingly, the slider 23 additionally raises the keyboard unit 24 in the thickness direction (Z direction). As a result, the upper end surface 231a of the first wedge-shaped protrusion 231 abuts on the lower end surface 241a of the second wedge-shaped protrusion 241, thus completing the raise of the keys 5.

Figure 7A:
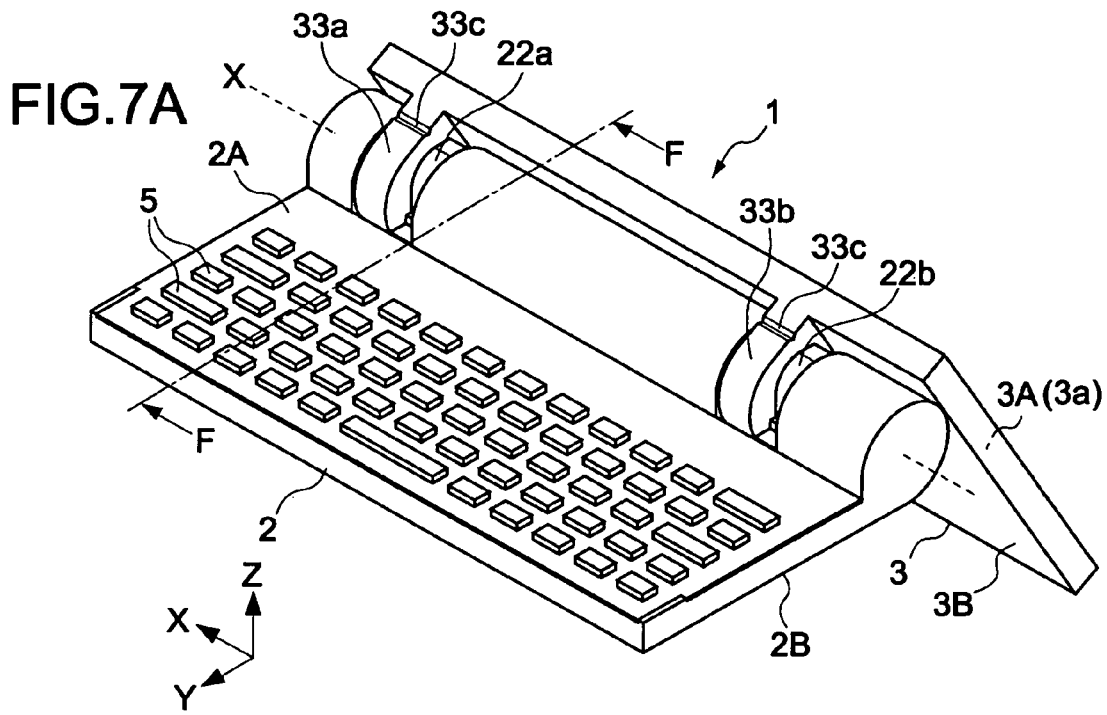
FIG. 7A is a perspective view showing an initial state of an operation for fixing positions of the keys.
Figure 7B:
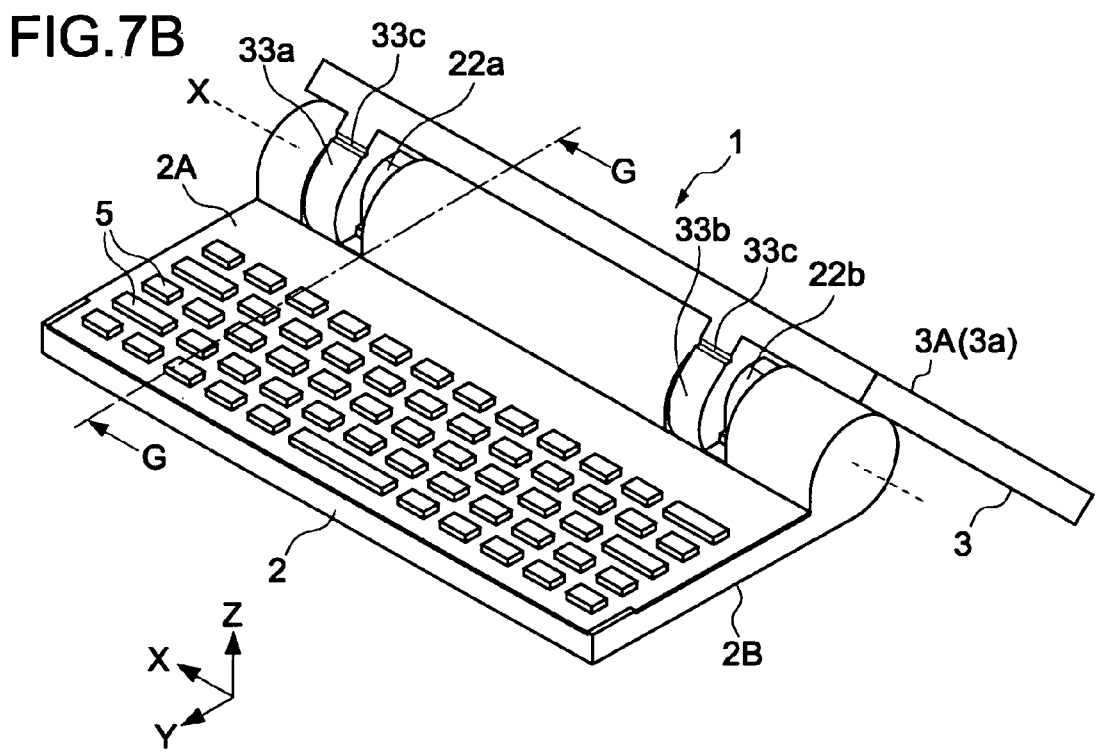
FIG. 7B is a perspective view showing a state where the display portion is additionally rotated from the state shown in FIG. 7A.

FIG. 7A is a perspective view showing an initial state of an operation for fixing positions of the keys 5, and FIG. 7B is a perspective view showing a state where the display portion 3 is additionally rotated from the state shown in FIG. 7A. FIG. 11A is a cross-sectional view of the electronic apparatus 1 taken along the line F-F of FIG. 7A, and FIG. 11B is a cross-sectional view of the electronic apparatus 1 taken along the line G-G of FIG. 7B.

The display portion 3 is additionally rotated with respect to the main body portion 2 as shown in FIG. 7A from the state shown in FIG. 6B.

At this time, the pin 34a that is rotated about the rotational axis X presses the slide cam 22a in the linear groove 221b as shown in FIG. 11A. Accordingly, the slide cam 22a slides to the deep side of the depth direction (Y direction). Accordingly, the slider 23 fixed to the slide cam 22a additionally slides to the deep side of the depth direction. At this time, the upper end surface 231a of the first wedge-shaped protrusion 231 of the slider 23 abuts on the lower end surface 241a of the second wedge-shaped protrusion 241 of the keyboard unit 24 to slide. The upper end surface 231a and the lower end surface 241a are parallel to the direction in which the slider 23 slides (Y direction). Therefore, the keyboard unit 24 is not raised in the thickness direction even when the slider 23 slides in the depth direction. In other words, the keys 5 are not raised from the surface 2A of the main body portion 2 between the state shown in FIG. 10B and the state shown in FIG. 11A.

Next, the display portion 3 is additionally rotated with respect to the main body portion 2 as shown in FIG. 7B from the state shown in FIG. 7A.

Accordingly, the pin 34a that is rotated about the rotational axis X presses the slide cam 22a in the linear groove 221b as shown in FIG. 11B. Accordingly, the slide cam 22a additionally slides to the deep side of the depth direction (Y direction), and the slider 23 fixed to the slide cam 22a additionally slides to the deep side of the depth direction. At this time, the upper end surface 231a of the first wedge-shaped protrusion 231 of the slider 23 abuts on the lower end surface 241a of the second wedge-shaped protrusion 241 of the keyboard unit 24 to slide. Also at this time, the keyboard unit 24 is not raised in the thickness direction even when the slider 23 slides in the depth direction.

FIG. 8A is a perspective view showing an end state of the operation for fixing the positions of the keys 5, and FIG. 8B is a perspective view showing a state where the display portion 3 is parallel to the main body portion 2. FIG. 12A is a cross-sectional view of the electronic apparatus 1 taken along the line H-H of FIG. 8A, and FIG. 12B is a cross-sectional view of the electronic apparatus 1 taken along the line J-J of FIG. 8B.

The display portion 3 is additionally rotated with respect to the main body portion 2 as shown in FIG. 8A from the state shown in FIG. 7B.

At this time, the pin 34a that is rotated about the rotational axis X presses the slide cam 22a in the linear groove 221b as shown in FIG. 12A. Accordingly, the slide cam 22a slides to the deep side of the depth direction together with the slider 23. As a result, the slide amount of the slider 23 becomes largest (slide amount S) when the pin 34a is positioned in the vicinity of an upper end of the linear groove 221b of the cam groove 221A. In this case, the upper end surfaces 231a of the first wedge-shaped protrusions 231 of the slider 23 are arranged to substantially correspond to the lower end surfaces 241a of the second wedge-shaped protrusions 241 of the keyboard unit 24 in the depth direction. Accordingly, the lower end surfaces 241a are supported by the upper end surfaces 231a, with the result that the slider 23 and the keyboard unit 24 are positioned with respect to the key-portion cabinet 21 of the main body portion 2.

As described above, the operation for fixing the position of the keyboard unit 24 is ended. In other words, as shown in FIGS. 5A to 8A and 9A to 12A, in conjunction with the rotation of the display portion 3, the slide cams 22a and 22b slide to the deep side of the depth direction (Y direction) and the keys 5 protrude from the surface 2A of the main body portion 2 to be positioned.

Next, the display portion 3 is additionally rotated with respect to the main body portion 2 as shown in FIG. 8B from the state shown in FIG. 8A.

At this time, though the pin 34a that is rotated about the rotational axis X is additionally rotated about the rotational axis X as shown in FIG. 12B, the second arc-shaped groove 221c is formed along the trail of the movement of the pin 34a and therefore the pin 34a is rotated in the second arc-shaped groove 221c without causing a force to act on the slide cam 22a. In other words, the slide cam 22a and the slider 23 do not slide in the depth direction (Y direction) from the state shown in FIG. 12A to the state shown in FIG. 12B. As a result, the keys 5 are not raised between those states of FIG. 12.

Figure 13:
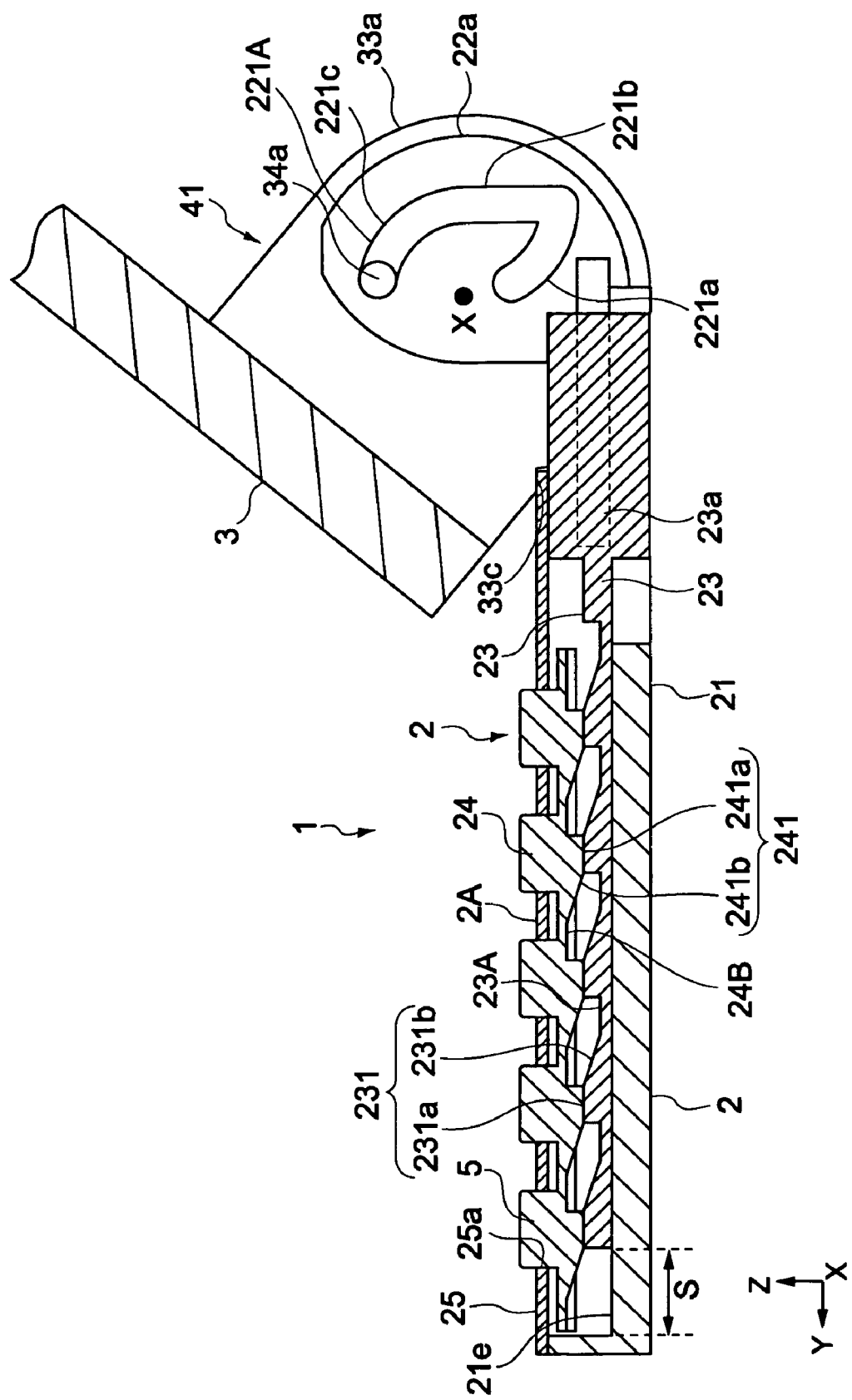
FIG. 13 is a cross-sectional view of the electronic apparatus taken along the line M-M of FIG. 2.

FIG. 13 is a cross-sectional view of the electronic apparatus 1 taken along the line M-M of FIG. 2.

Next, the display portion 3 is additionally rotated with respect to the main body portion 2 as shown in FIG. 13 from the state shown in FIG. 8B.

At this time, though the pin 34a that is rotated about the rotational axis X is rotated about the rotational axis X, the second arc-shaped groove 221c is formed along the trail of the movement of the pin 34a and therefore the pin 34a is rotated in the second arc-shaped groove 221c without causing a force to act on the slide cam 22a. As a result of the rotation of the display portion 3, the pin 34a is positioned at an end of the second arc-shaped groove 221c as shown in FIG. 13. At this time, the engagement groove 33c provided to each of the first protrusions 33a and 33b is engaged with the end portion of the key cover 25.

According to this embodiment as described above, the first protrusions 33a and 33b provided with the bearing portions 331a and 331b are provided so as to protrude from the back surface 3B of the display portion 3 in the direction orthogonal to the back surface 3B, and the second protrusions 21b and 21c provided with the shafts 211a and 211b are provided so as to protrude from the surface 2A of the main body portion 2 in the direction orthogonal to the surface 2A. With this structure, the display portion 3 can be provided up to a position at which the display portion 3 overlaps the coupling mechanisms 41, with the result that the size of the display portion 3 can be made large by the size c of the coupling mechanisms 41 in the depth or width direction (Y direction). As a result, the size of the display screen 3a may be made relatively large or may be increased as compared to that of other types or kinds of foldable or inverse clamshell electronic apparatuses. As an example, the width of the display screen 3a may be approximately 80 percent or larger of the width of the display portion 3. (The remaining 20 percent or so may correspond to the previously described small perimeter or rim portion thereof, in which half of such amount may be on a first or top part thereof and the other half may be on the opposite side part or bottom part thereof.)

The first protrusions 33a and 33b and the second protrusions 21b and 21c each have a substantially disc shape, and the shafts 211a and 211b and the bearing portions 331a and 331b are rotatably coupled to each other at positions protruding from the surface 2A of the main body portion 2 in the direction orthogonal to the surface 2A (Z direction). In other words, as compared to a case where the rotational axis X is positioned closer to the surface 2A in the Z direction, an angle formed by the surface of the coupling portion 4 with respect to the surface 2A (angle formed by the surface of the coupling portion 4 that rises with respect to the surface 2A and the surface 2A) can be increased. Accordingly, when the display portion 3 is rotated along the surfaces of the second protrusions 21b and 21c of the coupling portion 4, a range of rotatable angles of the display portion 3 can be widened. In such a manner, the display portion 3 can be rotated with respect to the main body portion 2 between the closed state where the back surface 3B of the display portion 3 and the back surface 2B of the main body portion 2 face each other (FIG. 1) and the opened state where the angle θ formed by the display screen 3a with respect to the surface 2A of the main body portion 2 is an obtuse angle (FIG. 2).

As described above, an inverse clamshell-type cellular phone that is rotated about the coupling portion 4 incorporating the batteries 42A can be realized. In the closed state of the display portion 3 shown in FIG. 1, the display screen 3a of the display portion 3 functions as a touch panel, with the result that the electronic apparatus 1 can be used as a cellular phone in which the entire surface 3A is a touch panel. In the state of FIG. 2 where the display portion 3 is opened, the electronic apparatus 1 can be used as a small-sized personal computer including a QWERTY keyboard.

Since the columnar batteries 42A and the columnar battery accommodation portion 42 that accommodates columnar batteries 42A are provided between the pair of coupling mechanisms 41, it is possible to increase a capacity for the batteries 42A while achieving downsizing of the electronic apparatus 1 by making the best use of the area formed between the pair of coupling mechanisms 41.

Each of the first protrusions 33a and 33b includes the engagement groove 33c that abuts on the end portion of the key cover 25 and restricts the angle θ formed by the display screen 3a with respect to the surface 2A of the main body portion 2 in the state where the display portion 3 is opened with respect to the main body portion 2 as shown in FIG. 2 (see FIG. 13). Accordingly, it is possible to restrict a rotation angle of the display portion 3 with respect to the main body portion 2 reliably and with a simple structure.

As the raising/lowering mechanism of the keys 5, the pins 34a and 34b that are provided in a protruding manner to the first protrusions 33a and 33b, respectively, the slide cams 22a and 22b that are provided with the cam grooves 221A and 221B, respectively, with which the pins 34a and 34b are engaged, respectively, the slider 23 that is provided so as to be slidable in the depth direction and includes the plurality of first wedge-shaped protrusions 231, and the keyboard unit 24 formed with the plurality of second wedge-shaped protrusions 241 on the bottom surface 24B side are provided.

Accordingly, it is possible to raise the keys 5 from the surface 2A of the main body portion 2 in conjunction with the rotation of the display portion 3 and lower the keys 5 from the surface 2A of the main body portion 2 in conjunction with the rotation of the display portion 3 conversely.

As shown in FIG. 12A, the lower end surfaces 241a of the second wedge-shaped protrusions 241 of the keyboard unit 24 can be supported by the upper end surfaces 231a of the first wedge-shaped protrusions 231 of the slider 23. Accordingly, it is possible to reliably support almost the entire area of the bottom surface 24B side of the keyboard unit 24 and also obtain a good typing feeling of the keys 5.

Since the surface 2A of the main body portion 2 and the upper surfaces of the keys 5 are positioned on substantially the same plane in the state where the keys 5 are lowered as shown in FIG. 1, a user can easily carry the electronic apparatus 1.

Figure 26:
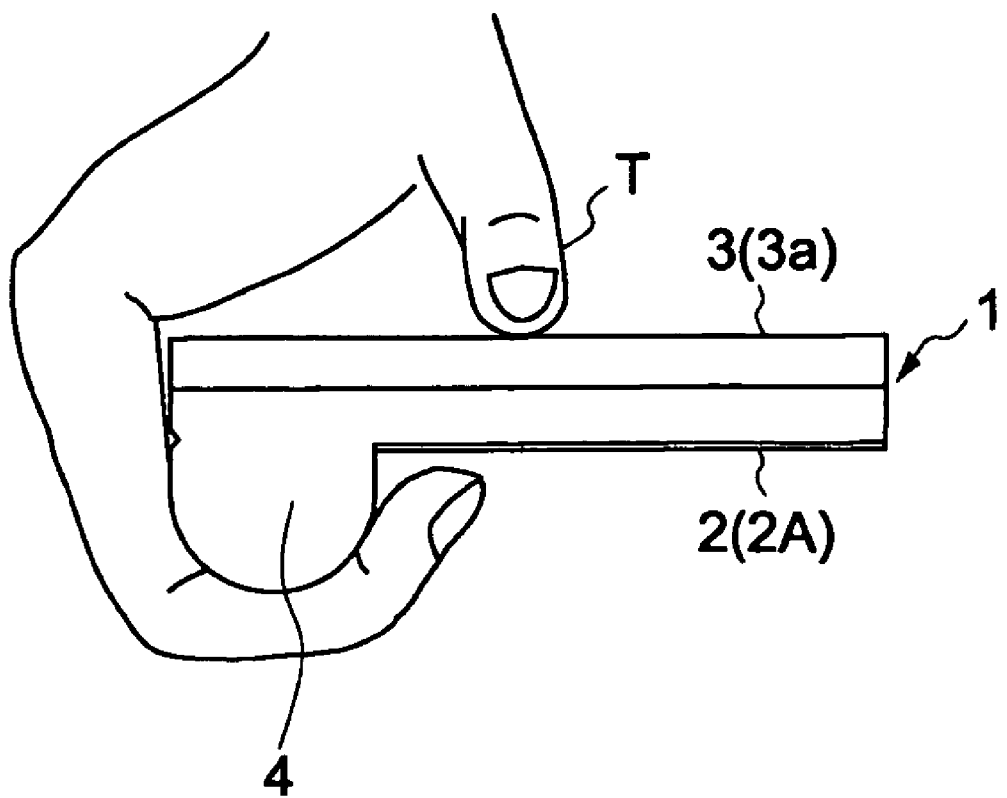
FIG. 26 is a view showing a state where a closed electronic apparatus is held.

Since the user can grip and hold the cylinder-shaped coupling portion 4 in the state where the display portion 3 is folded with respect to the main body portion 2 as shown in FIG. 26, the user can easily carry the electronic apparatus 1 and easily make a touch operation on the display screen 3a with a thumb T while gripping the coupling portion 4.

On the other hand, since the keys 5 can be raised in the state where the display portion 3 is opened with respect to the main body portion 2 as shown in FIGS. 2 and 12B, it is possible to easily make a key input operation while viewing the display screen 3a, for example.

Figure 14:
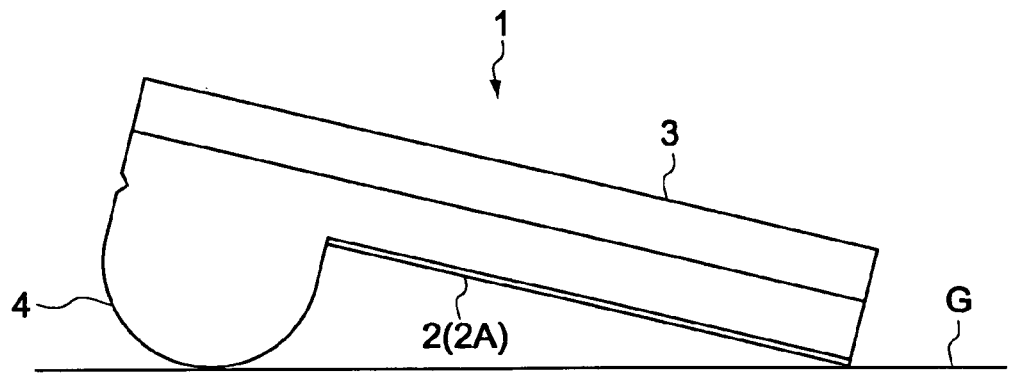
FIG. 14 is a side view showing a use example of the electronic apparatus shown in FIG. 1.

FIG. 14 is a side view showing a use example of the electronic apparatus 1 shown in FIG. 1. It is also possible to use the electronic apparatus 1 while placing it on a placement surface G with the display portion 3 being closed with respect to the main body portion 2, and the main body portion 2 and the coupling portion 4 facing the placement surface G. At this time, a part of the coupling portion 4 and an end portion of the main body portion 2 abut on the placement surface G. In this case, the display screen 3a is tilted with respect to the placement surface G by a predetermined angle because the coupling portion 4 and the battery accommodation portion 42 each have a substantially-columnar shape protruding from the surface 2A of the main body portion 2. As a result, it is possible to easily make a touch operation of the display screen 3a by the user.

Second Embodiment

Next, an electronic apparatus according to a second embodiment of the present invention will be described. It should be noted that in this embodiment and subsequent embodiments, the same components as those in the above embodiment are denoted by the same reference symbols and descriptions thereof will be omitted. Differences will be mainly described.

Structure of Electronic Apparatus

Figure 15:
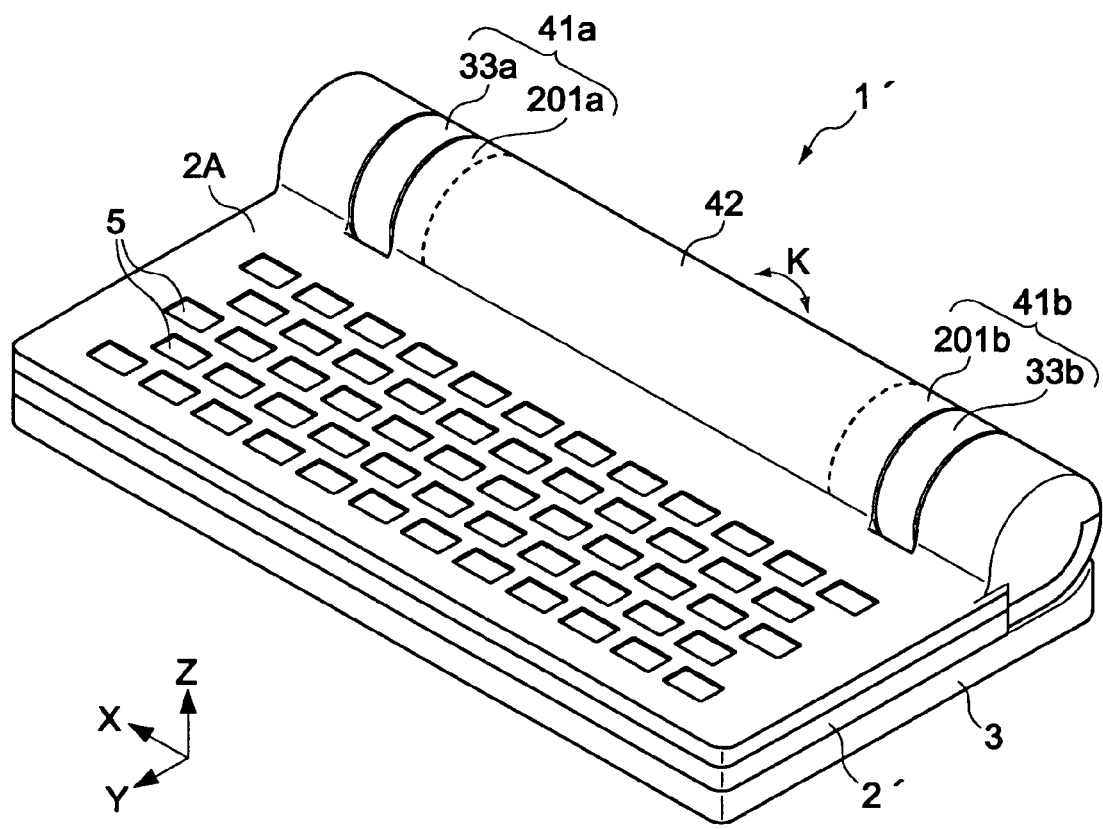
FIG. 15 is a perspective view showing a closed state of an electronic apparatus according to a second embodiment.
Figure 16:
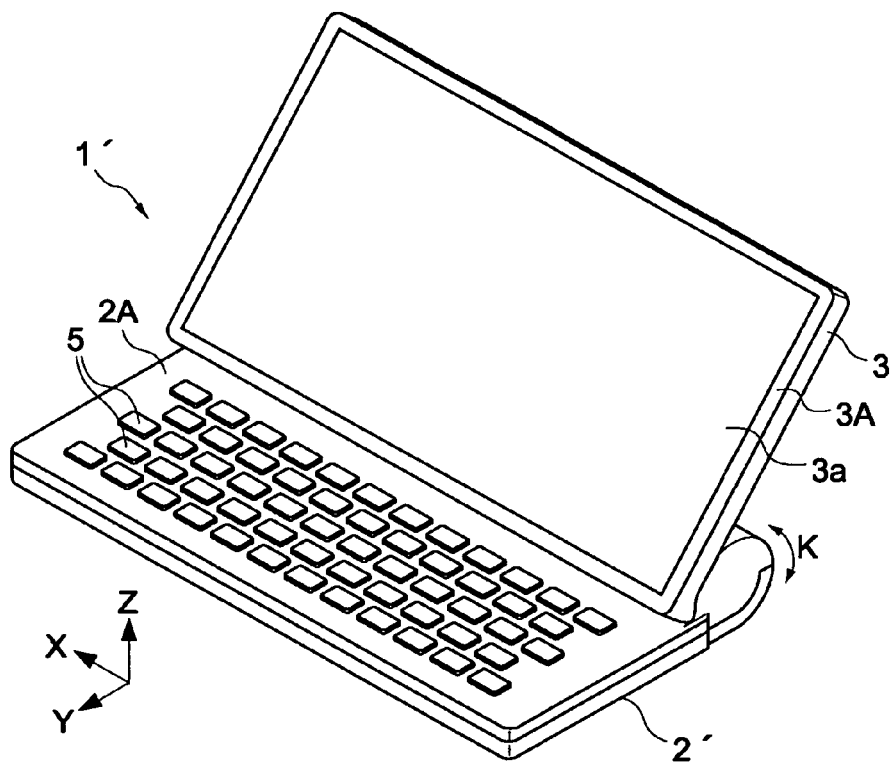
FIG. 16 is a perspective view showing an opened state of the electronic apparatus shown in FIG. 15.

FIG. 15 is a perspective view showing a closed state of the electronic apparatus of the second embodiment, and FIG. 16 is a perspective view showing an opened state of the electronic apparatus shown in FIG. 15.

An electronic apparatus 1' is different from the electronic apparatus 1 of the first embodiment in that the electronic apparatus 1' includes coupling mechanisms 41a and 41b that rotatably couple the display portion 3 to a main body portion 2' to be described later and a raising/lowering mechanism that is different from the raising/lowering mechanism for the plurality of keys 5 in the first embodiment.

Figure 17:
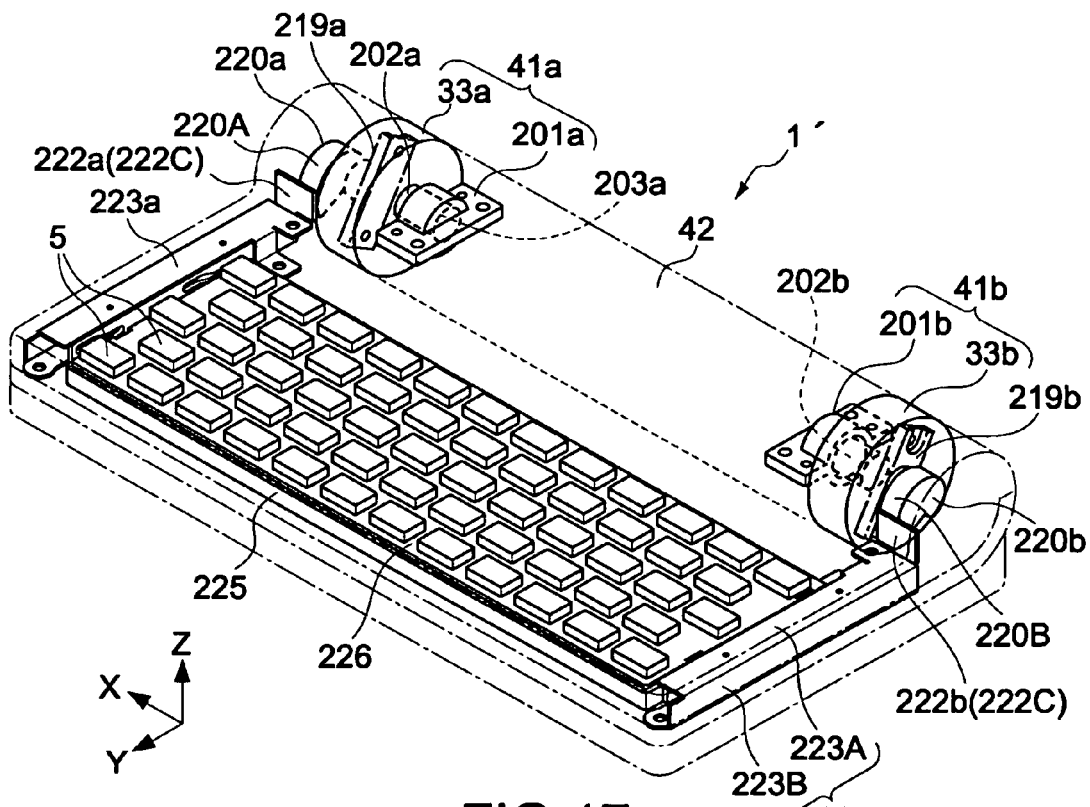
FIG. 17 is a perspective view showing an internal structure of the electronic apparatus with the display portion being closed.
Figure 18:
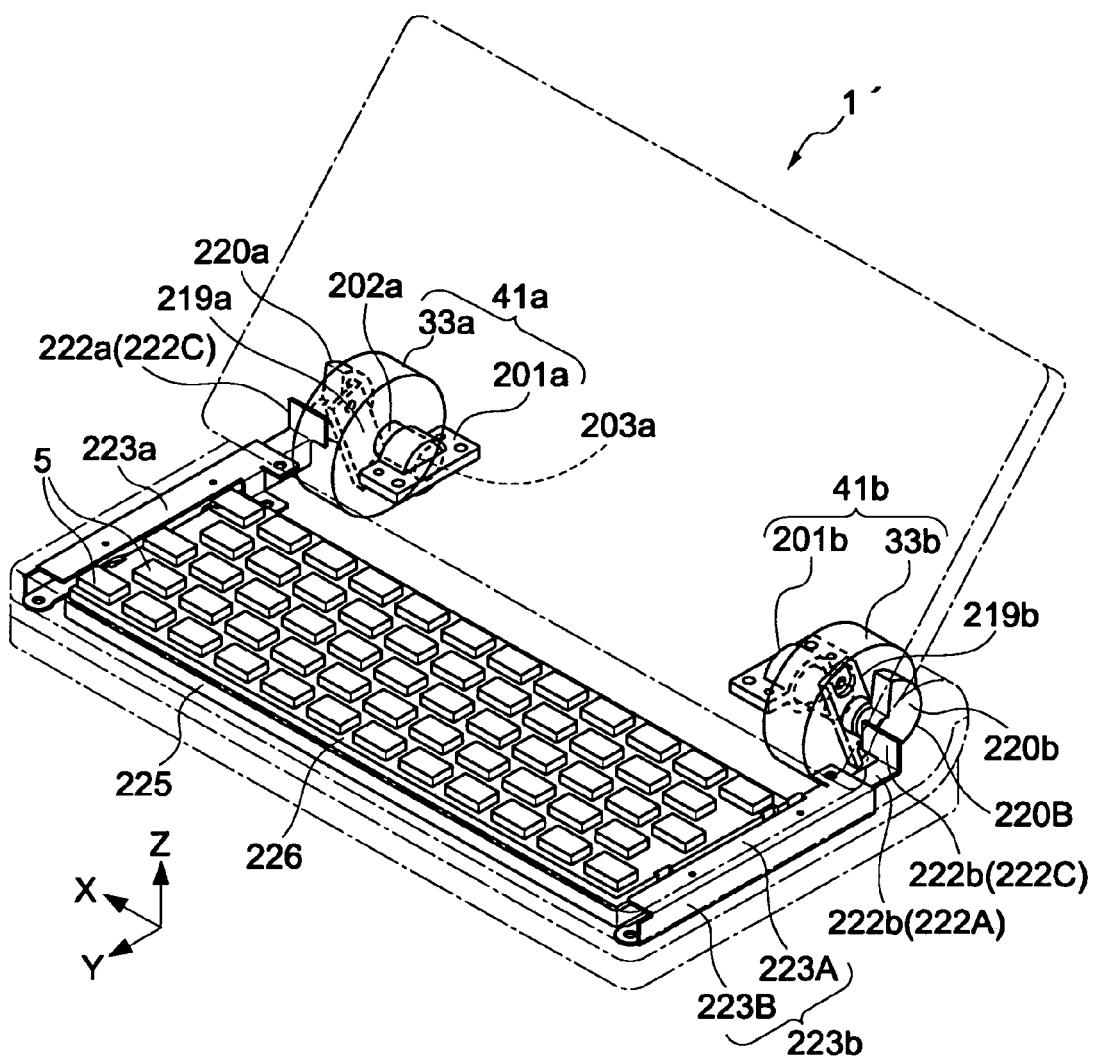
FIG. 18 is a perspective view showing the internal structure of the electronic apparatus with the display portion being opened.
Figure 19:
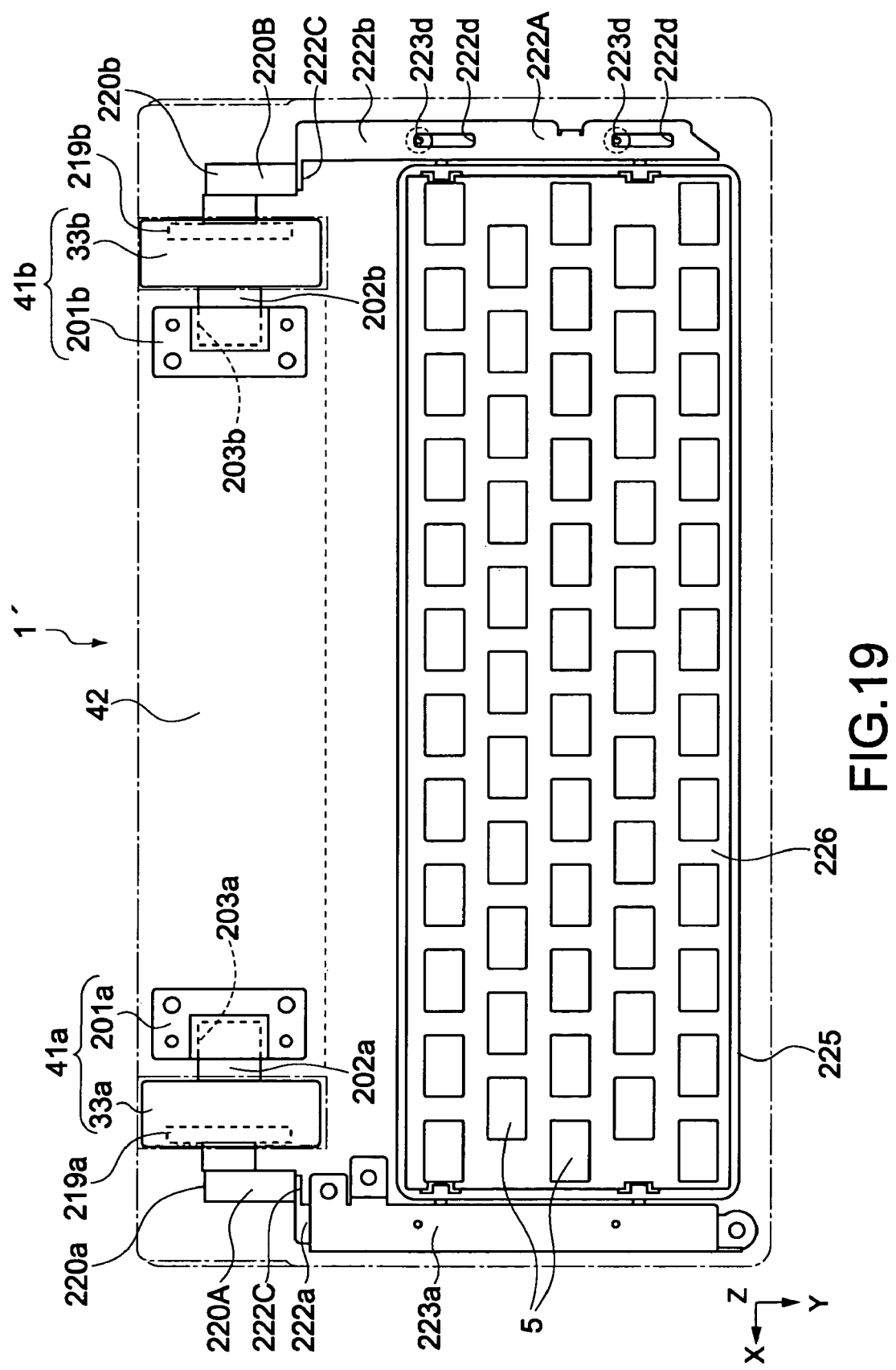
FIG. 19 is a plan view showing the internal structure of the electronic apparatus with the display portion being closed.
Figure 20:
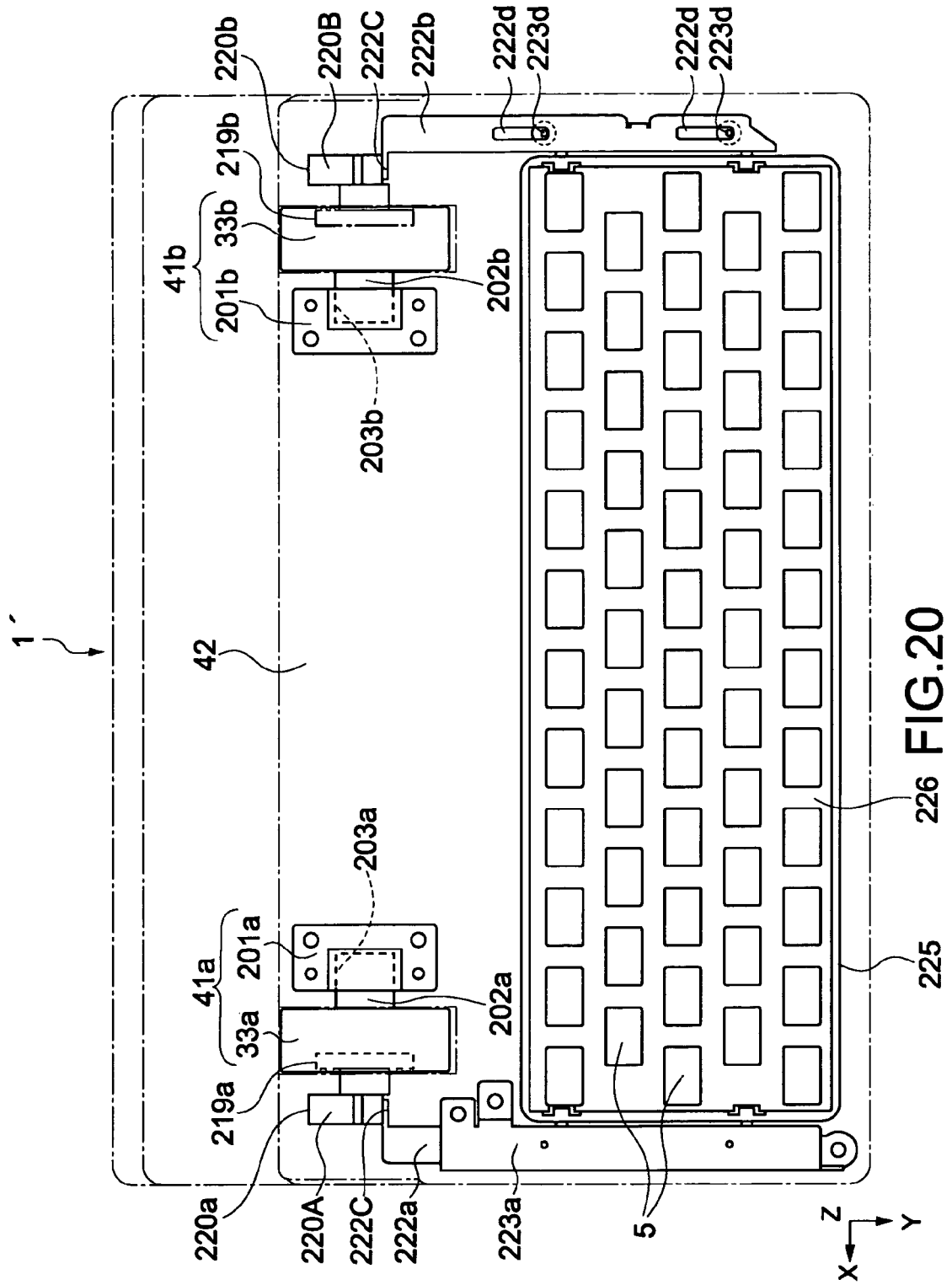
FIG. 20 is a plan view showing the internal structure of the electronic apparatus with the display portion being opened.

FIG. 17 is a perspective view showing an internal structure of the electronic apparatus 1' shown in FIG. 15. FIG. 18 is a perspective view showing the internal structure of the electronic apparatus 1' with the display portion 3 being opened. FIG. 19 is a plan view showing the internal structure of the electronic apparatus 1' with the display portion 3 being closed. FIG. 20 is a plan view showing the internal structure of the electronic apparatus 1' with the display portion 3 being opened. FIG. 21A is a perspective view showing the inside of the electronic apparatus 1' with the display portion 3 being closed, seen from a bottom surface side, and FIG. 21B is an enlarged view of the vicinity of a spring 224b and a shaft portion 230. It should be noted that in FIGS. 17 to 21, outer shapes of the main body portion 2', the display portion 3, and the like are indicated by alternate long and short dashed lines.

Coupling Mechanisms 41a and 41b

The coupling mechanism 41a includes a first protrusion 33a and a bearing member 201a. A shaft 202a is provided to a side surface of the first protrusion 33a in a protruding manner in a direction along the rotational axis X as shown in FIGS. 17 and 19. The shaft 202a is fitted into a shaft hole 203a of the bearing member 201a in the battery accommodation portion 42 as shown in FIG. 19, the bearing member 201a being fixed to the battery accommodation portion 42 side using a screw or the like.

The coupling mechanism 41b includes a first protrusion 33b and a bearing member 201b. A shaft 202b is provided to a side surface of the first protrusion 33b in a protruding manner in the direction along the rotational axis X as shown in FIGS. 17 and 19. The shaft 202b is fitted into a shaft hole 203b of the bearing member 201b as shown in FIG. 19. With this structure, the display portion 3 is rotatably coupled to the main body portion 2'.

Raising/Lowering Mechanism for the Plurality of Keys 5

A raising/lowering mechanism of the second embodiment raises/lowers the plurality of keys 5 in conjunction with the rotation of the display portion 3 with respect to the main body portion 2'. The raising/lowering mechanism includes a fixing plate 219a, a cam lever 220a, a cam slider 222a, a holder 223a, a spring to be described later (not shown) that are provided on the left side of the main body portion 2' as shown in FIG. 17 and constitute a part of the raising/lowering mechanism, a fixing plate 219b, a cam lever 220b, a cam slider 222b, a holder 223b, the spring 224b (see FIG. 21) that are provided on the right side of the main body portion 2' and constitute a part of the raising/lowering mechanism, a receiving base 225, and a keyboard unit 226. Since the part of the raising/lowering mechanism that is arranged on the left side of the main body portion 2' and the other part of the raising/lowering mechanism that is arranged on the right side of the main body portion 2' have substantially the same structure, a description on the latter will be given and a description on the former will be omitted.

The fixing plate 219b has a rectangular shape, for example, and is fixed to the first protrusion 33b within the first protrusion 33b using a screw or the like (see FIG. 19).

Figure 22:
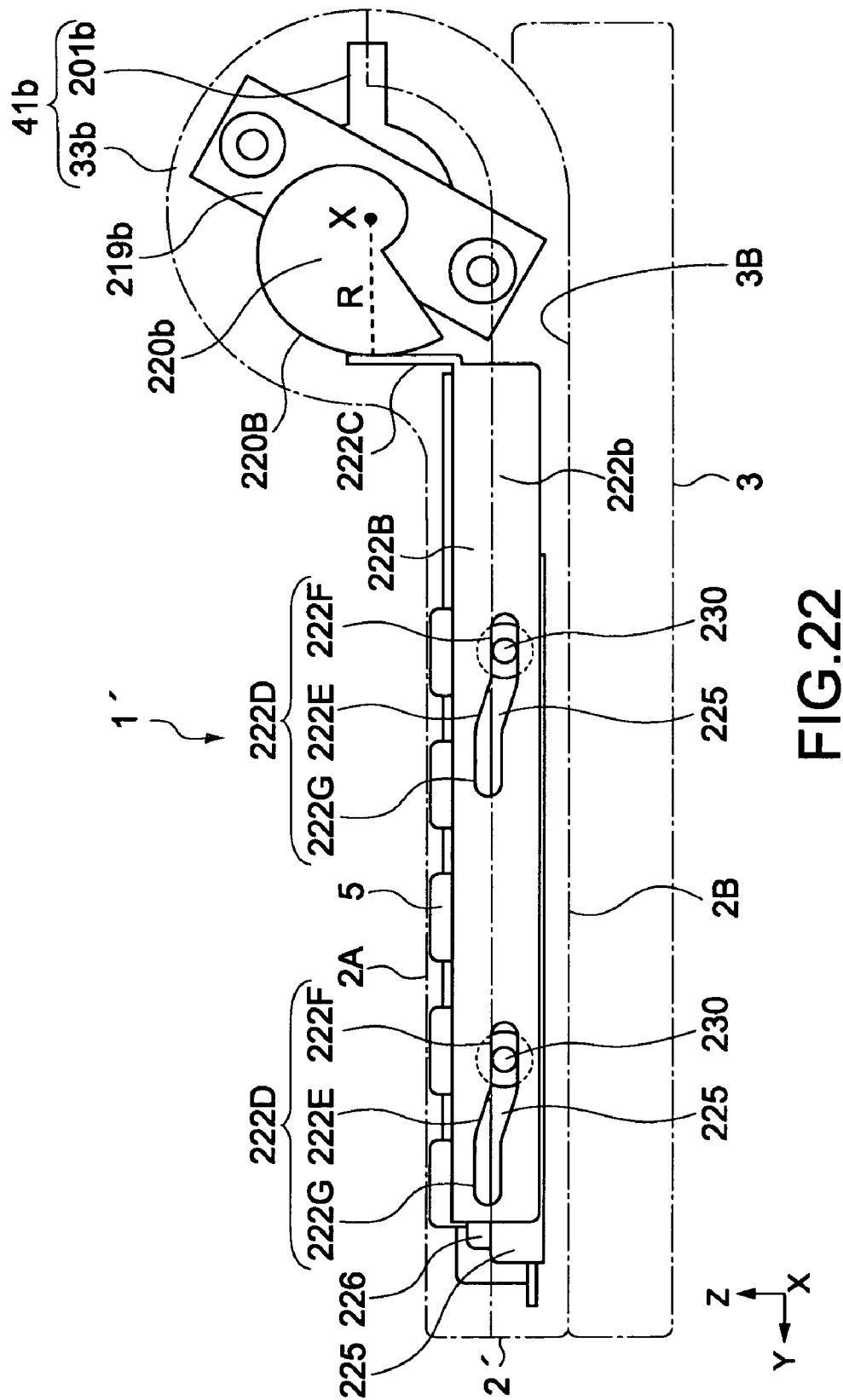
FIG. 22 is a side view showing the internal structure of the electronic apparatus with the display portion being closed.

The cam lever 220b is formed integrally with the fixing plate 219b and has a curved surface 220B that abuts on the cam slider 222b. A length R extending from the curved surface 220B of the cam lever 220b to the rotational axis X gradually becomes shorter in a clockwise direction with the rotational axis X being as the center (FIG. 22). The cam lever 220b is rotated about the rotational axis X integrally with the fixing plate 219b along with the rotation of the display portion 3. At this time, the curved surface 220B of the cam lever 220b slides with respect to the cam slider 222b.

The holder 223b that is long in the depth direction (Y direction) is arranged at a right end portion of the main body portion 2' in the longitudinal direction (X direction). The holder 223b supports the cam slider 222b that is long in the depth direction (Y direction) as shown in FIG. 19 so that the cam slider 222b is movable in the depth direction (see FIG. 17). The holder 223b includes a rectangular flat plate portion 223A that is long in the depth direction (Y direction) and a side wall portion 223B that is bent with respect to the flat plate portion 223A in the thickness direction.

The cam slider 222b includes a flat plate portion 222A, a side wall portion 222B that is erected with respect to the flat plate portion 222A in the thickness direction of the main body portion 2', and an abutment portion 222C that abuts on the cam lever 220b as shown in FIGS. 17 to 21. The abutment portion 222C is bent with respect to the flat plate portion 222A in the thickness direction (see FIG. 18). The flat plate portion 222A has a plurality of grooves 222d whose longitudinal direction is the depth direction (Y direction) as shown in FIG. 19. The grooves 222d are formed away from each other in the depth direction. A length of slide of the cam slider 222b is restricted based on a length of each of the grooves 222d in the depth direction. A pin 223d protruding in the thickness direction (Z direction) from the holder 223b that is not shown in FIG. 19 is fitted into each of the grooves 222d.

As shown in FIG. 21, the spring 224b is provided in a space that is defined by the flat plate portion 222A and side wall portion 222B of the cam slider 222b and the side wall portion 223B of the holder 223b, the space being extended in the depth direction. An end of the spring 224b is engaged with the flat plate portion 222A of the cam slider 222b and the other end thereof is engaged at a position of the holder 223b on the deep side of the depth direction.

The abutment portion 222C of the cam slider 222b is pressed against the cam lever 220b by a force of the spring 224b as shown in FIGS. 19 and 21. In other words, the cam lever 220b is rotated integrally with the fixing plate 219b along with the rotation of the display portion 3, and the cam slider 222b slides in the depth direction (Y direction) in conjunction with the rotation of the cam lever 220b.

A plurality of through-holes 222D are formed in the side wall portion 222B of the cam slider 222b. The through-holes 222D are formed away from each other in the depth direction (Y direction). Each of the through-holes 222D is an elongated hole and includes a tilted hole 222E, a first guide hole 222F connected to an end of the tilted hole 222E, and a second guide hole 222G connected to the other end of the tilted hole 222E. The tilted hole 222E is a hole extending between positions with different heights in the thickness direction (Z direction). The tilted hole 222E is lowered to a lower position (back surface side of main body portion 2') in the thickness direction (Z direction) while extending toward the near side of the depth direction (Y direction). The first guide hole 222F and the second guide hole 222G are formed parallel to the direction in which the cam slider 222b slides (Y direction).

The shaft portion 230 that is movable in the through-hole 222D along the through-hole 222D is inserted into each of the through-holes 222D. A shaft direction of the shaft portions 230 is along the axial direction of the rotational axis X. Each of the shaft portions 230 is fixed to the receiving base 225 at one end side that is an opposite side of a tip end thereof. In other words, the shaft portions 230 provided two each on left and right side surfaces of the receiving base 225 are inserted into the through-holes 222D of the cam sliders 222a and 222b, for example. With this structure, the through-holes 222D guide the shaft portions 230 to the higher or lower positions in the thickness direction (Z direction) in conjunction with the slide of the cam sliders 222a and 222b in the depth direction (Y direction), with the result that the receiving base 225 is raised/lowered integrally with the shaft portions 230 in the thickness direction (Z direction). The keyboard unit 226 is accommodated in and fixed to the receiving base 225.

Opening/Closing Operation

Next, an opening/closing operation of the display portion 3 of the electronic apparatus 1' of the second embodiment will be described.

Figure 23:
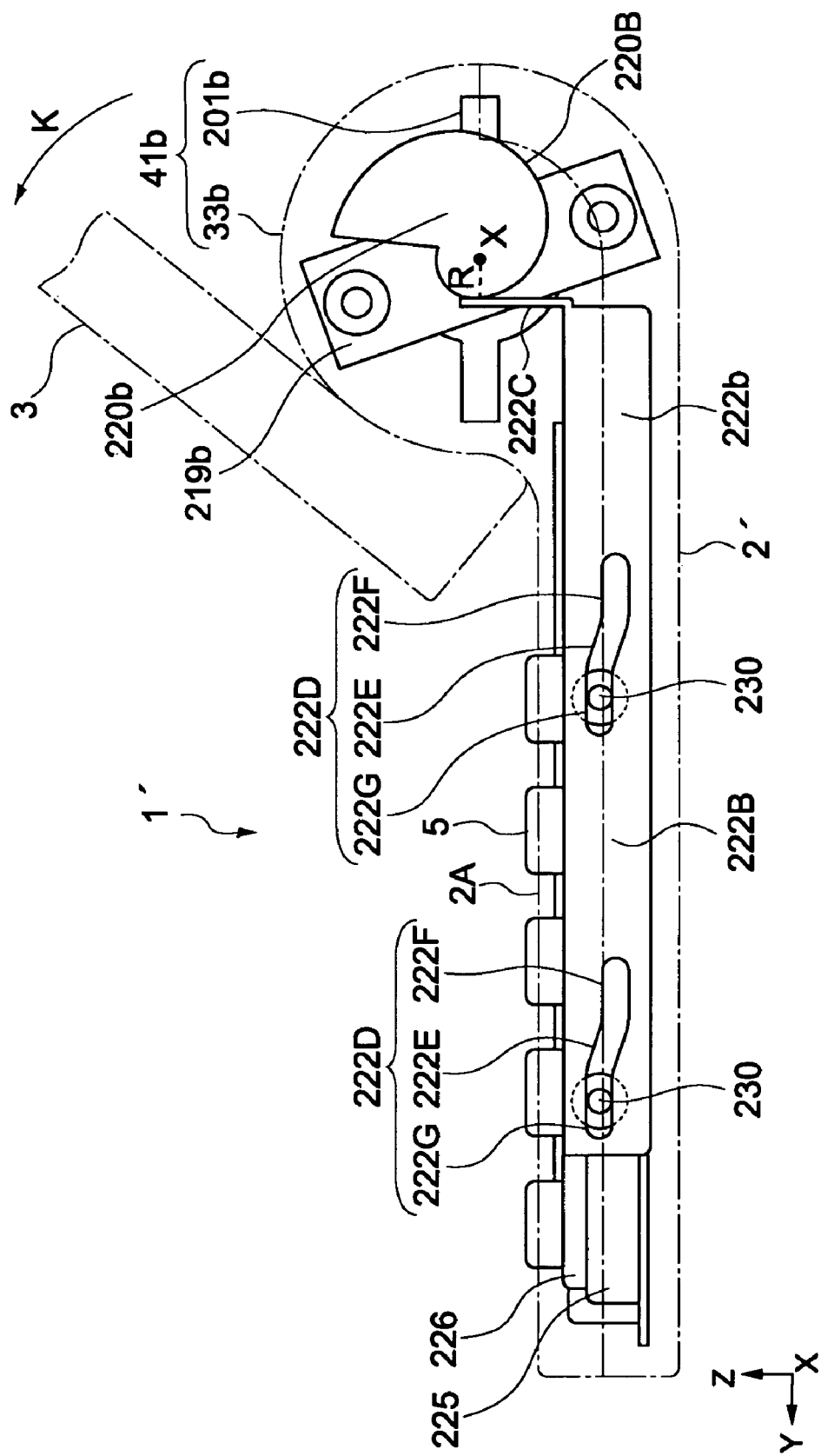
FIG. 23 is a side view showing the internal structure of the electronic apparatus with the display portion being opened.

FIG. 22 is a side view showing the internal structure of the electronic apparatus 1' with the display portion 3 being closed, and FIG. 23 is a side view showing the internal structure of the electronic apparatus 1' with the display portion 3 being opened.

The opening/closing operation of the display portion 3 between the closed state of the display portion 3 with respect to the main body portion 2' shown in FIG. 22 and the opened state of the display portion 3 with respect to the main body portion 2' shown in FIG. 23 will be described.

In the closed state of the display portion 3, the shaft portions 230 are positioned within the first guide holes 222F of the through-holes 222D as shown in FIG. 22. In other words, the shaft portions 230 are positioned at the lower positions within the through-holes 222D in the thickness direction of the main body portion 2' (Z direction). Therefore, the receiving base 225 to which the shaft portions 230 are fixed is arranged at the lower position in the thickness direction (Z direction). As a result, the keys 5 of the keyboard unit 226 that is accommodated in the receiving base 225 are slightly depressed from the surface 2A of the main body portion 2'. The cam slider 222b is pressed against the cam lever 220b by the spring 224b (see FIG. 21) with the abutment portion 222C of the cam slider 222b abutting on the curved surface 220B of the cam lever 220b.

When the display portion 3 is rotated with respect to the main body portion 2', the fixing plate 219b and the cam lever 220b are rotated in a counterclockwise direction integrally with the display portion 3 as shown in FIG. 23. Since the length R extending from the rotational axis X to the curved surface 220B of the cam lever 220b gradually becomes shorter in a clockwise direction, the cam slider 222b slides to the deep side of the depth direction (Y direction) in conjunction with the rotation of the cam lever 220b in the counterclockwise direction. Since the tilted hole 222E is formed in each of the through-holes 222D, each shaft portion 230 is guided from the lower portion to the above portion of the tilted hole 222E in conjunction with the slide of the cam slider 222b in the depth direction (Y direction), and raised in the thickness direction (Z direction) as shown in FIG. 23. Since each shaft portion 230 is fixed to the receiving base 225, the receiving base 225 is raised integrally with the shaft portions 230 in the thickness direction (Z direction). As a result, the keys 5 are raised from the surface 2A.

Action etc.

According to this embodiment as described above, as in the first embodiment, the size of the display portion 3 in the depth direction (Y direction) can be made larger and the raising/lowering operation of the keys 5 can be interlocked with the opening/closing operation of the display portion 3.

Modified Examples

Modified examples of the raising/lowering mechanism of the keys 5, which is interlocked with the opening/closing operation of the display portion 3 with respect to the main body portion 2 of the first embodiment or the main body portion 2' of the second embodiment, will be described.

Figure 24A:
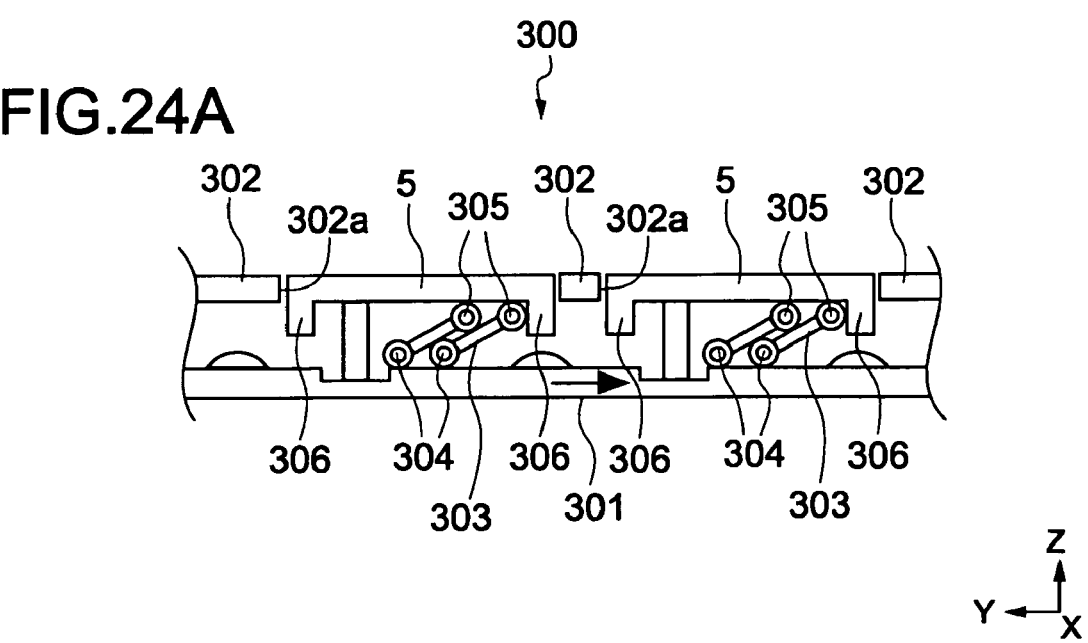
FIG. 24A is a cross-sectional view showing a keyboard unit in a state where an electronic apparatus of a modified example is folded.
Figure 24B:
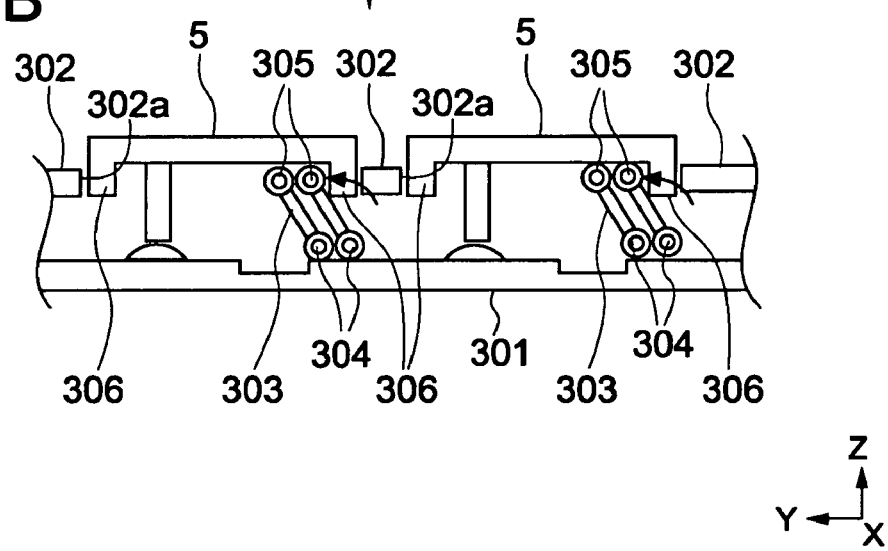
FIG. 24B is a cross-sectional view showing the keyboard unit in a state where the electronic apparatus of the modified example is opened.

FIG. 24A is a cross-sectional view showing a keyboard unit in a state where an electronic apparatus of a modified example is folded, and FIG. 24B is a cross-sectional view showing the keyboard unit in a state where the electronic apparatus of the modified example is opened.

The electronic apparatus of this modified example includes a mechanism in which a keyboard unit slider 301 of a keyboard unit 300 is caused to slide in the depth direction (Y direction) in conjunction with the opening/closing operation of the display portion with respect to the main body portion. Since a slide mechanism similar to the slide mechanism of the slider 23 of the first embodiment (see FIG. 4) or the slide mechanism of the cam slider 222b of the second embodiment (see FIG. 18) can be used as the slide mechanism of this modified example, a description thereof will be omitted.

The keyboard unit 300 includes the plurality of keys 5, the keyboard unit slider 301, an upper surface portion 302, and a coupling member 303.

The upper surface portion 302 constitutes an upper surface side of the keyboard unit 300. The upper surface portion 302 is formed with a plurality of opening portions 302a in which the keys 5 are raised/lowered. In the state where the display portion is closed with respect to the main body portion, the upper surface of the upper surface portion 302 and those of the keys 5 are positioned on substantially the same plane (XY plane) as shown in FIG. 24A. The keys 5 are formed with guides 306 that are provided in a protruding manner in a direction orthogonal to the upper surfaces of the keys 5 (Z direction).

Each key 5 and the keyboard unit slider 301 are rotatably coupled to each other by two coupling members 303. One end portion of each of the coupling members 303 and the keyboard unit slider 301 are rotatably coupled to each other by a coupling shaft portion 304. The other end portion of each of the coupling members 303 and each key 5 are rotatably coupled to each other by a coupling shaft portion 305. Each of the coupling shaft portions 304 and 305 has a hinge structure, for example.

The keyboard unit slider 301 slides to the deep side (right side of FIG. 24) of the depth direction (Y direction) in conjunction with the rotation of the display portion with respect to the main body portion. At this time, the upper surface portion 302 of the keyboard unit 300 does not slide. Therefore, the guides 306 of the keys 5 receive a force from the opening portions 302a of the upper surface portion 302 in a direction opposite to a direction in which the keyboard unit slider 301 slides. As a result, the coupling members 303 are rotated in a counterclockwise direction so as to be erected with respect to the keyboard unit slider 301, with the guides 306 of the keys 5 abutting on the opening portions 302a of the upper surface portion 302 of the keyboard unit 300 (see FIG. 24B). At this time, since the guides 306 that protrude from the keys 5 slide with respect to the opening portions 302a of the upper surface portion 302, the keys 5 are smoothly raised in the thickness direction (Z direction) as shown in FIG. 24B.

In the state where the keys 5 are raised as shown in FIG. 24B, lower ends of the guides 306 are still positioned below the upper surface of the upper surface portion 302. Accordingly, when the opened state of the display portion shown in FIG. 24B is changed to the closed state of the display portion shown in FIG. 24A, the guides 306 of the keys 5 can slide with respect to the opening portions 302a. In such a manner, the present invention can be applied to various keyboard units.

The present invention is not limited to the embodiments described above. The present invention can be executed by being variously modified within a range of the technical idea.

In the first embodiment, the example in which the keys 5 are raised/lowered in conjunction with the rotation of the display portion 3 with respect to the main body portion 2 has been described. In this case, since the keys 5 do not protrude from the upper surface of the main body portion in the closed state of the display portion 3, it is possible to prevent an incorrect operation of the keys 5 from occurring. However, by providing no raising/lowering mechanism of the keys 5 to an electronic apparatus and maintaining the state where the keys 5 protrude from the upper surface of the main body portion even in the closed state of the display portion 3, it may be possible to make an input operation using the keys 5 in a state where the display portion is folded. In this case, a user can operate the keys 5 protruding from the main body portion while viewing the display screen.

In the first embodiment, the example in which the surface 2A of the key cover 25 of the main body portion 2 and the upper surfaces of the keys 5 are positioned on substantially the same plane in the closed state of the display portion 3 shown in FIG. 1 has been described. However, it may be possible to slightly depress the keys 5 from the surface 2A of the key cover 25 of the main body portion 2 in the closed state of the display portion 3 shown in FIG. 1. Conversely, in the second embodiment, the example in which the keys 5 are slightly depressed from the surface 2A of the main body portion 2' in the closed state of the display portion 3 shown in FIG. 22 has been described. However, it may be possible to position the surface 2A and the upper surfaces of the keys 5 substantially on the same plane in the closed state of the display portion 3 shown in FIG. 22.

Figure 25:
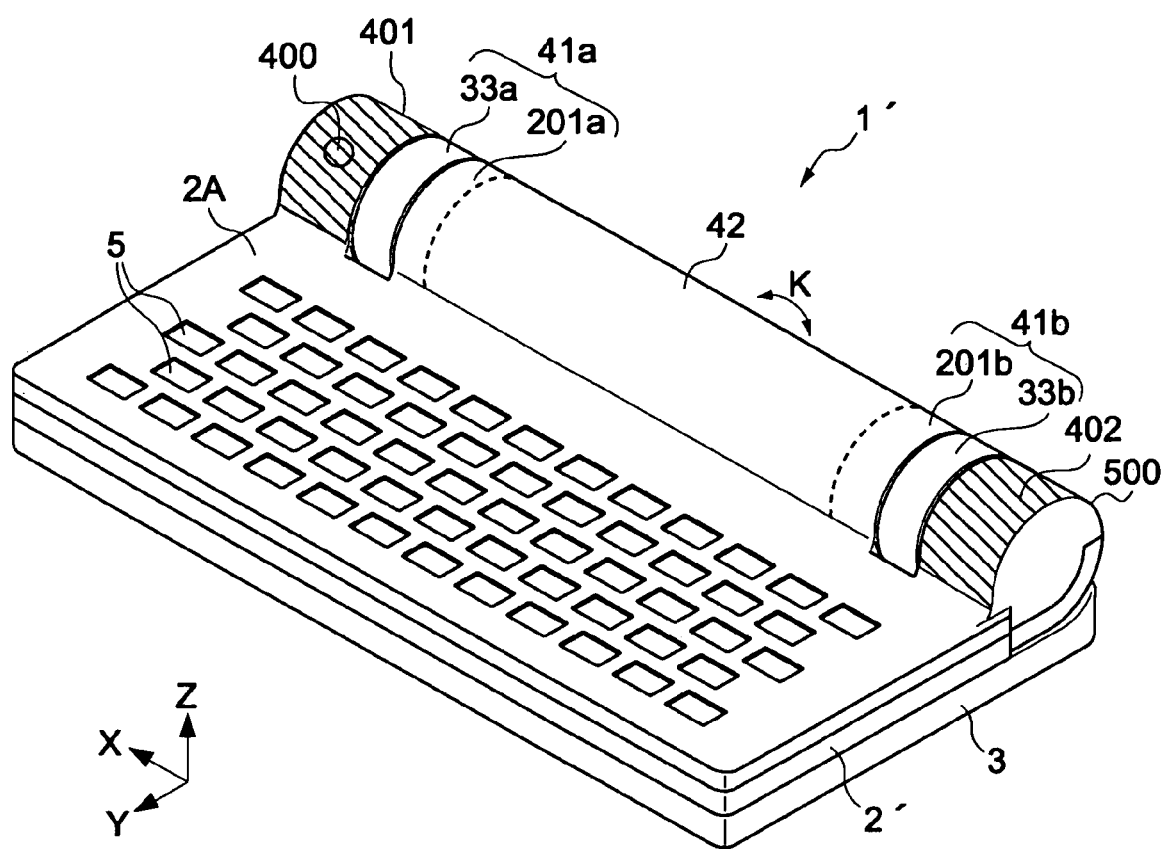
FIG. 25 is a perspective view showing a structure of an electronic apparatus of another modified example.

FIG. 25 is a perspective view showing a structure of an electronic apparatus of another modified example. As shown in FIG. 25, it may be possible to incorporate a camera 400 in an end portion 401 that is provided adjacently to a coupling mechanism 41a. In other words, the camera 400 may be provided so as to be exposed on an outer curved surface of the end portion 401, which is indicated by oblique lines in FIG. 25. A position of the camera 400 can be changed as appropriate within areas indicated by the oblique lines in FIG. 25. It should be noted that a camera (not shown) may be incorporated in an end portion 402 that is provided adjacently to a coupling mechanism 41b. With this structure, it is possible to input keys while viewing the display screen 3a and also take a picture using the camera 400 in the state where the display portion 3 is opened with respect to the main body portion 2'. Further, it may possible to take a picture by using the camera 400 even in the closed state of the display portion 3. In addition, it may be possible to provide a small projector in place of or in addition to the camera 400 such that the camera 400 is exposed on the outer curved surface of the end portion 401 or the end portion 402. For example, by providing a projector (not shown) so as to be exposed on the outer curved surface of the end portion 402 on a rear surface 500 side, it is possible to project image light from the projector toward the back of the electronic apparatus. As a result, it is possible to input keys while viewing the display screen 3a and also project an image from the projector onto a screen or the like, for example, in the state where the display portion 3 is opened with respect to the main body portion 2'. Similarly, a camera or a projector may be incorporated in the second protrusion 21b or the columnar end portion 21d shown in FIG. 3 in the electronic apparatus 1 shown in FIG. 2. Also in this case, the same effect as that of the electronic apparatus of this modified example can be obtained.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic apparatus operable as a wireless device having multiple protrusions which are operable to couple portions of the apparatus to each other, the apparatus comprising:

a main body portion having a main body portion back surface and a keyboard located at a part of the main body portion other than the main body portion back surface;

a display portion having a display portion back surface and a display screen on a display surface which is opposite the display portion back surface, the display surface having a length and a width associated therewith in which the length corresponds to a larger one of the length and the width; and a coupling portion that rotatably couples the main body portion and the display portion between a closed state and an open state or between the open state and the closed state, the coupling portion having a first protrusion which protrudes from the display portion back surface in a direction orthogonal to the display portion back surface, a second protrusion which protrudes from a surface opposite the main body portion back surface in a direction orthogonal to the surface opposite the main body portion back surface, and a shaft which rotatably couples the first protrusion and the second protrusion together, in the closed state, the main body portion back surface and the display portion back surface face each other and the electronic apparatus is operable as a portable apparatus in which all of the display surface having the display screen except for a relatively small perimeter portion thereof is usable as a display in at least a direction corresponding to the width thereof, and in the opened state, the electronic apparatus is operable as a small-sized personal computer.

2. The electronic apparatus according to claim 1, in which in the closed state, the keyboard is inoperable.

3. The electronic apparatus according to claim 1, in which in the closed state, the keyboard is operable to control a number of operations of the display screen.

4. The electronic apparatus according to claim 1, in which the display screen is usable as a touch panel.

5. The electronic apparatus according to claim 1, in which in the closed state, the electronic apparatus is operable as a cellular telephone.

6. The electronic apparatus according to claim 1, in which the main body portion has a main body portion length and a main body portion width associated therewith, and in which the coupling portion includes a mechanism to raise the keyboard while the main body portion and the display portion are being placed in the open state and to lower the keyboard while the main body portion and the display portion are being placed in the closed state such that the keyboard is raised and lowered in a thickness direction which is orthogonal to a plane formed by the main body portion length and the main body portion width.

7. The electronic apparatus according to claim 6, in which the keyboard includes a plurality of keys, and in which in the closed state an upper surface of each of the plurality of keys and a surface opposite the main body portion back surface are positioned so as to lie in substantially a same plane, and in which in the open state the plurality of keys protrude upward from the surface opposite the main body portion back surface such that the upper surface of each of the plurality of keys lie in a different plane from that of the surface opposite the main body portion back surface.

8. The electronic apparatus according to claim 1, in which the coupling portion enables the main body portion and the display portion to rotate more than 180 degrees relative to each other when the main body portion and the display portion are being placed in the open state.

9. The electronic apparatus according to claim 8, further comprising an engagement portion which restricts rotation of the main body portion and the display portion relative to each other such that in the opened state an angle formed between the display surface and a surface opposite the main body portion back surface lies in a range of more than 90 degrees to less than 180 degrees.

10. The electronic apparatus according to claim 1, in which the main body portion has a main body portion length and a main body portion width associated therewith in which the main body portion length corresponds to a larger one of the main body portion length and the main body portion width, the coupling portion has a coupling portion width associated therewith which extends in a direction parallel to that of the main body portion width, and in which the width of the display surface is substantially equal to a sum of the main body portion width and the coupling portion width.

11. A foldable electronic apparatus comprising:

a main body portion having a main body portion back surface and a keyboard located at a part of the main body portion other than the main body portion back surface;

a display portion having a display portion back surface and a display screen on a display surface which is opposite the display portion back surface; and a coupling portion that rotatably couples the main body portion and the display portion between a closed state and an open state or between the open state and the closed state, the coupling portion having a first protrusion which protrudes from the display portion back surface in a direction orthogonal to the display portion back surface, a second protrusion which protrudes from a surface opposite the main body portion back surface in a direction orthogonal to the surface opposite the main body portion back surface, and a shaft which rotatably couples the first protrusion and the second protrusion together, in the closed state, the electronic apparatus having a length extending in a longitudinal direction, a thickness extending in a thickness direction which is orthogonal to the main body portion back surface or the display portion back surface, and a width extending in a width direction which is perpendicular to the longitudinal direction and to the thickness direction, the main body portion having a main body portion width which extends in the width direction, the coupling portion having a coupling portion width which extends in the width direction, and the display portion having a display portion width which extends in the width direction, in which the display portion width is substantially equal to a sum of the main body portion width and the coupling portion width, in the closed state, the main body portion back surface and the display portion back surface face each other and the electronic apparatus is operable as a portable apparatus in which all of the display surface except for a relatively small perimeter portion thereof is usable as the display screen in the width direction, and in the opened state, the electronic apparatus is operable as a small-sized personal computer.

12. The foldable electronic apparatus according to claim 11, in which the coupling portion has another first protrusion protruding from the display portion back surface in the direction orthogonal to the display portion back surface so as to have two first protrusions which are spaced apart from each other in the longitudinal direction, another second protrusion protruding from the surface opposite the main body portion back surface in the direction orthogonal to the surface opposite the main body portion back surface so as to have two second protrusions which are spaced apart from each other in the longitudinal direction, and another shaft which rotatably couples the other first protrusion and the other second protrusion together, in which one of the two first protrusions, one of the two second protrusions and one said shaft forms a first coupling mechanism and another one of the first protrusions, another one of the second protrusions and the other shaft forms a second coupling mechanism, and in which a battery accommodation portion for holding a battery is arranged between the first coupling mechanism and the second coupling mechanism.

13. The electronic apparatus according to claim 1, in which the keyboard is changeable between a first state and a second state or between the second state and the first state such that when the main body portion and the display portion are in the closed state the keyboard is in the first state and when the main body portion and the display portion are in the open state the keyboard is in the second state, in which the first state is different from the second state.

14. A foldable electronic apparatus comprising:
a main body portion;
a display portion having a display surface, the display surface having a length and a width associated therewith in which the length corresponds to a larger one of the length and the width; and
a coupling portion that rotatably couples the main body portion and the display portion between a closed state and an open state or between the open state and the closed state, the coupling portion having a first protrusion which protrudes from a display portion back surface in a direction orthogonal to the display portion back surface, a second protrusion which protrudes from a surface opposite a main body portion back surface in a direction orthogonal to the surface opposite the main body portion back surface, and a shaft which rotatably couples the first protrusion and the second protrusion together,
in the closed state, back surfaces of the main body portion and the display portion face each other and the electronic apparatus is operable as a portable apparatus in which all of the display surface having the display screen except for a relatively small perimeter portion thereof is usable as a display in at least a direction corresponding to the width thereof, and
in the opened state, the electronic apparatus is operable as a small-sized personal computer.

15. The foldable electronic apparatus according to claim 14, in which a device to enable the user to perform an input operation is located on a surface other than the display surface.

* * * * *